United States Patent
Abe et al.

(10) Patent No.: US 9,334,808 B2
(45) Date of Patent: May 10, 2016

(54) COMBUSTOR AND THE METHOD OF FUEL SUPPLY AND CONVERTING FUEL NOZZLE FOR ADVANCED HUMID AIR TURBINE

(75) Inventors: Kazuki Abe, Tokai (JP); Tomomi Koganezawa, Tokai (JP)

(73) Assignee: Mitsubishi Hitachi Power Systems, Ltd., Yokohama (JP)

(*) Notice: Subject to any disclaimer, the term of this patent is extended or adjusted under 35 U.S.C. 154(b) by 1178 days.

(21) Appl. No.: 13/197,953

(22) Filed: Aug. 4, 2011

(65) Prior Publication Data

US 2012/0031103 A1 Feb. 9, 2012

(30) Foreign Application Priority Data

Aug. 5, 2010 (JP) ................................. 2010-175979
Aug. 5, 2010 (JP) ................................. 2010-175990

(51) Int. Cl.

| | |
|---|---|
| *F02C 9/28* | (2006.01) |
| *F02C 6/18* | (2006.01) |
| *F23L 7/00* | (2006.01) |
| *F23R 3/12* | (2006.01) |
| *F23R 3/28* | (2006.01) |
| *F23R 3/34* | (2006.01) |
| *F02C 7/22* | (2006.01) |

(52) U.S. Cl.
CPC ... *F02C 9/28* (2013.01); *F02C 6/18* (2013.01); *F02C 7/22* (2013.01); *F23L 7/005* (2013.01); *F23R 3/12* (2013.01); *F23R 3/28* (2013.01); *F23R 3/346* (2013.01)

(58) Field of Classification Search
CPC ............... F02C 6/18; F02C 7/22; F02C 9/00; F02C 9/26; F02C 9/263; F02C 9/28; F23N 1/00; F23N 1/002; F23N 1/005; F23N 2025/26; F23N 2026/30; F23N 2900/05005; F23L 7/005; F23R 3/12; F23R 3/28; F23R 3/346
USPC ............... 60/39.53, 39.3, 39.59, 39.511, 775, 60/737, 740; 701/101
See application file for complete search history.

(56) References Cited

U.S. PATENT DOCUMENTS

| | | | |
|---|---|---|---|
| 6,260,350 B1 * | 7/2001 | Horii et al. ..................... | 60/39.3 |
| 6,575,148 B1 * | 6/2003 | Bhargava et al. ............. | 123/564 |

(Continued)

FOREIGN PATENT DOCUMENTS

| | | |
|---|---|---|
| EP | 0 526 152 A1 | 2/1993 |
| JP | 7-189743 A | 7/1995 |

(Continued)

OTHER PUBLICATIONS

European Search report dated Feb. 5, 2013 (eight (8) pages).

*Primary Examiner* — Phutthiwat Wongwian
*Assistant Examiner* — Jason H Duger
(74) *Attorney, Agent, or Firm* — Crowell & Moring LLP

(57) ABSTRACT

A fuel control device and method of a gas turbine combustor, for advanced humid air turbines, in which plural combustion units comprising plural fuel nozzles for supplying fuel and plural air nozzles for supplying air for combustion are provided. A part of the plural combustion units are more excellent in flame stabilizing performance than the other combustion units. A fuel ratio, at which fuel is fed to the part of the combustion units is set on the basis of internal temperature of the humidification tower and internal pressure of the humidification tower to control a flow ratio of the fuel fed to the plural combustion units.

4 Claims, 20 Drawing Sheets

(56) References Cited

U.S. PATENT DOCUMENTS

| | | | |
|---|---|---|---|
| 6,634,165 B2* | 10/2003 | Tomlinson et al. | 60/39.3 |
| 6,813,889 B2 | 11/2004 | Inoue et al. | |
| RE38,831 E* | 10/2005 | Horii et al. | 60/39.3 |
| 6,981,360 B2* | 1/2006 | Yagi et al. | 60/39.5 |
| RE39,092 E* | 5/2006 | Horii et al. | 60/39.53 |
| 7,712,301 B1* | 5/2010 | Wagner | 60/39.53 |
| 7,757,475 B2* | 7/2010 | Sasaki et al. | 60/39.5 |
| 2001/0020360 A1* | 9/2001 | Tsukamoto et al. | 60/39.53 |
| 2004/0200206 A1 | 10/2004 | McKelvey et al. | |
| 2005/0097881 A1* | 5/2005 | Shibata et al. | 60/39.511 |
| 2006/0218930 A1* | 10/2006 | Nuding et al. | 60/775 |
| 2007/0017227 A1* | 1/2007 | Horiuchi et al. | 60/775 |
| 2007/0021899 A1* | 1/2007 | Griffin et al. | 701/100 |
| 2008/0229755 A1* | 9/2008 | Koganezawa et al. | 60/775 |
| 2010/0269482 A1* | 10/2010 | Hirota et al. | 60/39.53 |
| 2010/0326083 A1* | 12/2010 | Bland | 60/775 |
| 2011/0076628 A1 | 3/2011 | Miura et al. | |
| 2011/0160979 A1* | 6/2011 | Muller | 701/100 |
| 2011/0270503 A1* | 11/2011 | Stuttaford et al. | 701/100 |
| 2012/0031103 A1* | 2/2012 | Abe et al. | 60/776 |
| 2013/0174571 A1* | 7/2013 | Abe et al. | 60/776 |

FOREIGN PATENT DOCUMENTS

| | | |
|---|---|---|
| JP | 2000-54857 A | 2/2000 |
| JP | 2005-164081 A | 6/2005 |
| JP | 2006-57607 A | 3/2006 |
| JP | 2008-175098 A | 7/2008 |

* cited by examiner

FIG. 2A
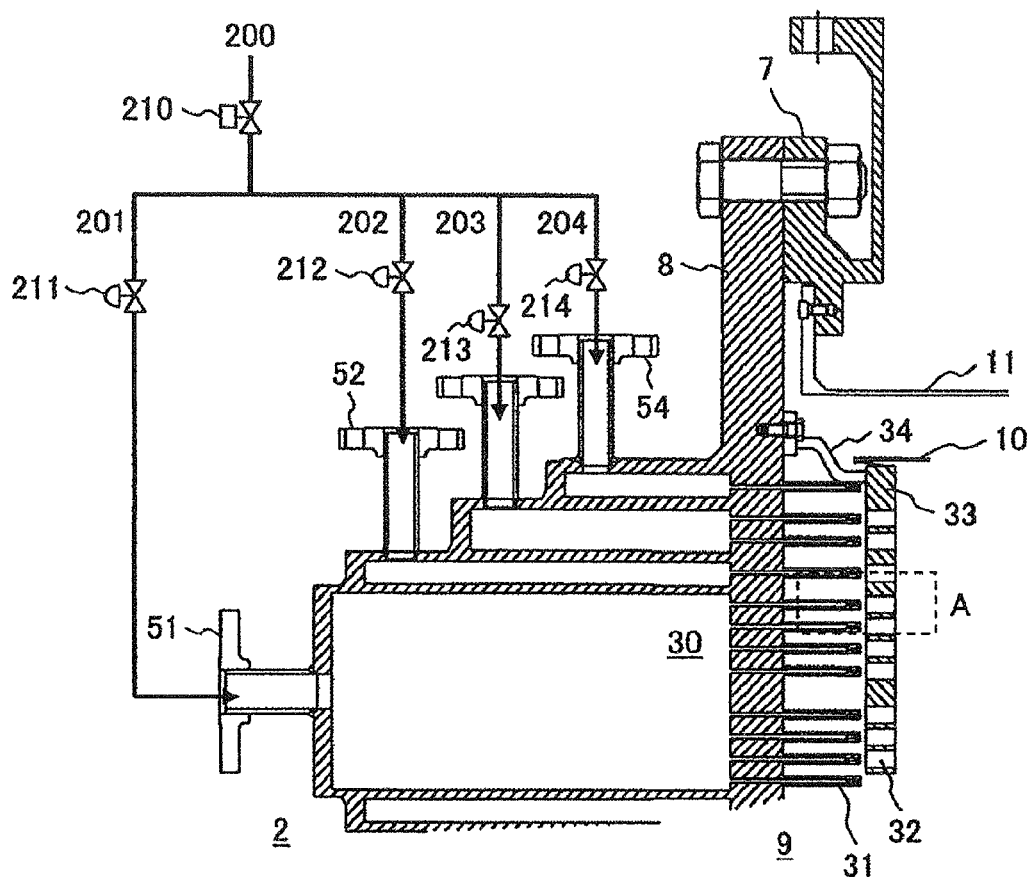
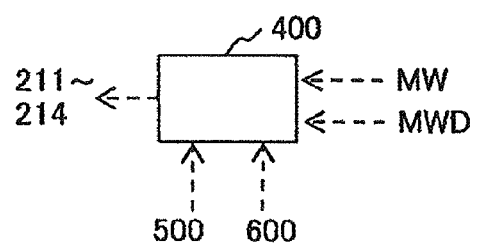
FIG. 2B
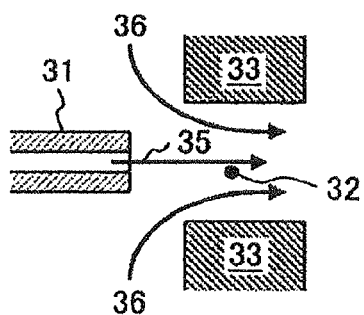

COMBUSTOR AND THE METHOD OF FUEL SUPPLY AND CONVERTING FUEL NOZZLE FOR ADVANCED HUMID AIR TURBINE

BACKGROUND OF THE INVENTION

The present invention relates to a fuel control method and a fuel control device of a gas turbine combustor for advanced humid air turbines for stably operating a low NOx gas turbine combustor mounted on an advanced humid air turbine.

Publicly known JP-A-2008-175098 discloses a technology relating to fuel control capable of maintaining flame stability while ensuring a low NOx performance of a combustor before and after starting of moisture addition in an advanced humid air turbine power-generating plant, in which an improvement is achieved in output and efficiency by adding a moisture to a gas turbine working fluid (air) to humidify the same and using the humidified air to recover thermal energy possessed by gas turbine exhaust gases.

Generally, due to changes in compressor intake air flow rate and a vibration characteristic of a rotating body upon an increase in number of revolutions at the start of a gas turbine, there is a tendency that a system is liable to become unstable due to disturbance as compared with the case after a rated revolution speed is reached. Also, in an advanced humid air turbine plant, disturbance is imparted to a gas turbine when addition of moisture is started in the course of an increase in number of revolutions, so that in order to ensure stability at the start, it is desirable to start addition of moisture in a state of partial loading after the rated revolution speed is reached.

On the other hand, in case of using a fuel, such as natural gas, kerosine, light gas oil, or the like, having a small nitrogen content, a major part of nitrogen oxides (NOx) generated in a gas turbine combustor is thermal NOx generated by oxidation of nitrogen contained in an air. Since generation of thermal NOx is high in temperature dependence, a decrease in flame temperature is generally a fundamental principle in a low NOx combustion method in gas turbines, which use these fuels.

As a measure for decrease in flame temperature, there is known premixed combustion, in which a fuel and an air is beforehand mixed and then burned. Also, in the case where an air for combustion is made high in temperature by a regenerator as in advanced humid air turbine plants, it is necessary to control a flame temperature appropriately to achieve a low NOx while preventing self-ignition of a fuel, and therefore a technology, in which a fuel and an air are jetted as a multiplicity of coaxial jets having a small diameter into a gas turbine combustion chamber and burned, is effective as disclosed in JP-A-2008-175098.

In such gas turbine combustors directed to a low NOx, in order to make a low NOx performance and flame stability compatible, it is essential to adjust a fuel-air ratio, which is a ratio of fuel flow rate and air flow rate, in a predetermined range.

Publicly known JP-A-07-189743 discloses, as a low NOx gas turbine combustor used in general gas turbines, a technology, in which a ratio of fuel flow and air flow supplied to a gas turbine combustor is regulated on the basis of that change in opening degree of a compressor inlet guide valve, which accompanies operation of a gas turbine, a change in atmospheric temperature, that change in air flow, which is attributable to a change in atmospheric pressure, and that change in fuel flow, which is attributable to a change in fuel temperature and fuel heating value.

When addition of moisture is started in an advanced humid air turbine plant, moisture content in combustion air is increased in a gas turbine combustor, so that a fuel is deprived of combustion heat by the moisture content to cause decrease in flame temperature to result in reduction in generation of NOx. Also, since a turbine working fluid is increased in flow by addition of moisture, decrease in flame temperature is caused and generation of NOx is reduced also when a fuel is decreased in order to maintain number of revolutions constant.

Further, since decrease in flame temperature upon burning in a gas turbine combustor leads to decrease in heating value recovered in a regenerator, decrease in combustion air temperature leads to decrease in flame temperature and reduction in generation of NOx.

In this manner, addition of moisture is started whereby (1) increase in moisture content, (2) reduction in fuel, and (3) decrease in air temperature proceed simultaneously to lead to decrease in flame temperature, so that generation of NOx is decreased but flame stability is worsened conversely.

Hereupon, when air distribution supplied to the gas turbine combustor is beforehand set taking account of moisture addition, it is possible to appropriately set an air flow supplied to a premixing unit or a coaxial jet unit at a head of the gas turbine combustor so that flame blow off is not generated under a high moisture content condition.

With a gas turbine combustor, in which air distribution supplied to the gas turbine combustor is set in this manner, however, flame temperature is increased in a converse manner as described above before starting of moisture addition, so that there is a tendency that generation of NOx is increased while flame stability is ensured.

That is, in an advanced humid air turbine, a large change in a condition for generation of NOx and flame stability in a gas turbine combustor occurs before and after starting of moisture addition. Also, it is thought that after starting of moisture addition, valve control, a volume of an associated system, or the like at the time of increase in gas turbine loading brings about lag until moisture is actually added to air for combustion.

Also, it is thought that at the time of decrease in gas turbine loading, lag is brought about for the same reason until an air for combustion is decreased in humidity. For such change in a condition, there is also demanded control means for stable combustion of a gas turbine combustor with low NOx.

Hereupon, as disclosed in JP-A-2008-175098, combustion stability after humidification can be ensured by forming a part of combustion units of a gas turbine combustor, which comprises a plurality of combustion units supplied individually with a fuel, from those combustion units (combustion units provided with air nozzles, which impart swirl to air flow), which are more excellent in flame stabilizing performance than the other combustion units, and setting a large ratio of a fuel supplied to the combustion units of excellent flame stabilizing performance so that for a predetermined period of time after starting of humidification, combustion gas temperature of the combustion units of excellent flame stabilizing performance become above combustion gas temperature before starting of humidification, to thereby control a fuel.

In case of ensuring combustion stability against such change in humidity by applying the technology of the control device as disclosed in JP-A-07-189743, it is conceivable to measure the moisture content in compressed air and to control a fuel flow ratio on the basis of the measured value.

Also, it has been assumed by test data analysis thereafter that a change in fuel ratio, which is caused with the lapse of time, is attributable to gradual increase in moisture content of compressed air in starting of humidification. That is, it has been found that even when a humidification tower feed water volume is held under a particular condition in a state of humidification, increase in moisture content of compressed air involves a certain lag and the lag has a time span and a changed width, which affect combustion stability and a low NOx performance in a gas turbine combustor.

In case of by ensuring combustion stability against change in compressed air humidity by applying the technology of the control device disclosed in JP-A-07-189743, it is conceivable to measure the moisture content in compressed air and to control a fuel flow ratio on the basis of the measured value.

However, air at a humidification tower outlet is in a saturated condition and at high temperature around 100° C., and if a humidity sensor is mounted at the humidification tower outlet, there is possibility that error becomes large in humidity measurement with the humidity sensor. Also, air at a regenerator outlet is not in a saturated condition but is at high temperature of 450° C. to 650° C., and if a humidity sensor is mounted at the regenerator outlet, there is caused a problem that a high thermal resistance is demanded of the humidity sensor at the regenerator outlet.

Hereupon, in an advanced humid air turbine plant, there is demanded control means of a gas turbine combustor, which makes low NOx and flame stability compatible against that change in combustion air humidity, which generates a large change in condition after starting of moisture addition with respect to generation of NOx and combustion stability in the combustor.

It is an object of the invention to provide a fuel control method and a fuel control device of a gas turbine combustor for advanced humid air turbines, in which method and device the gas turbine combustor can perform combustion stably with low NOx in the case where a transient change in a condition against generation of NOx and flame stability in the gas turbine combustor occurs after addition of moisture to a humidification tower of an advanced humid air turbine is started.

SUMMARY OF THE INVENTION

Fuel control method of a gas turbine combustor for advanced humid air turbines according to a first aspect of the invention comprises: a compressor; a gas turbine combustor, which uses compressed air compressed by the compressor to burn fuel to generate combustion gas; a turbine driven by the combustion gas generated in the gas turbine combustor; a humidification tower for humidification of the compressed air compressed by the compressor and fed to the gas turbine combustor; and a recuperator, in which water fed to the humidification tower is heated by exhaust gas discharged from the turbine, the gas turbine combustor including plural combustion units comprising plural fuel nozzles for supplying fuel and plural air nozzles for supplying air for combustion, a part of the plural combustion units being more excellent in flame stabilizing performance than the other combustion units, wherein a fuel ratio, at which fuel is fed to the part of the combustion units, which are excellent in flame stabilizing performance, is set on the basis of air humidity of compressed air estimated from internal temperature of the humidification tower and internal pressure of the humidification tower, and a flow ratio of fuel fed to the plural combustion units of the gas turbine combustor is controlled.

Fuel control method of a gas turbine combustor for advanced humid air turbines according to a second aspect of the invention comprises: a compressor; a gas turbine combustor, which uses compressed air compressed by the compressor to burn fuel to generate combustion gas; a turbine driven by the combustion gas generated in the gas turbine combustor; a humidification tower for humidification of the compressed air compressed by the compressor and fed to the gas turbine combustor; and a recuperator, in which water fed to the humidification tower is heated by exhaust gas discharged from the turbine, the gas turbine combustor including plural combustion units comprising plural fuel nozzles for supplying fuel and plural air nozzles for supplying air for combustion, a part of the plural combustion units being more excellent in flame stabilizing performance than the other combustion units, wherein a fuel ratio, at which fuel is fed to the part of the plural combustion units, which are more excellent in flame stabilizing performance, is set by giving a first order lag to change in the fuel ratio when a value set based on condition before starting of humidification of the compressed air by the humidification tower is changed to a value set based on condition after starting of humidification, whereby a flow ratio of fuel fed to the plural combustion units of the gas turbine combustor is controlled.

A fuel control device of a gas turbine combustor for advanced humid air turbines according to a third aspect of the invention comprises: a compressor; a gas turbine combustor, which uses compressed air compressed by the compressor to burn fuel to generate combustion gas; a turbine driven by the combustion gas generated in the gas turbine combustor; a humidification tower for humidification of the compressed air compressed by the compressor and fed to the gas turbine combustor; and a recuperator, in which water fed to the humidification tower is heated by exhaust gas discharged from the turbine, the gas turbine combustor including plural combustion units comprising plural fuel nozzles for supplying fuel and plural air nozzles for supplying air for combustion, a part of the plural combustion units being more excellent in flame stabilizing performance than the other combustion units, wherein the fuel control device for supplying fuel to the plural combustion units comprises: a bias calculator for calculating bias amount of a fuel ratio fed to the part of the combustion units, which are excellent in flame stabilizing performance, on the basis of humidity of the air for combustion estimated from internal air temperature of the humidification tower and internal pressure of the humidification tower; and a fuel flow ratio setter for calculating fuel ratio fed to the part of the combustion units, which are excellent in flame stabilizing performance, on the basis of output of the bias calculator, whereby flow ratio of the fuel fed to the plural combustion units is controlled.

A fuel control device of a gas turbine combustor for advanced humid air turbines according to a fourth aspect of the invention comprises: a compressor; a gas turbine combustor, which uses compressed air compressed by the compressor to burn fuel to generate combustion gas; a turbine driven by the combustion gas generated in the gas turbine combustor; a humidification tower for humidification of the compressed air compressed by the compressor and fed to the gas turbine combustor; and a recuperator, in which water fed to the humidification tower is heated by exhaust gas discharged from the turbine, the gas turbine combustor including plural combustion units comprising plural fuel nozzles for supplying fuel and plural air nozzles for supplying air for combustion, a part of the plural combustion units being more excellent in flame stabilizing performance than the other combustion units, wherein the fuel control device comprises: a fuel ratio setter for setting a fuel ratio, at which fuel is fed to the part of the combustion units, which are excellent in flame stabilizing performance; a bias setter for setting a bias amount of the fuel ratio, at which fuel is fed to the part of the combustion units, which are excellent in flame stabilizing performance, on the basis of a condition before starting of humidification of the compressed air by the humidification tower and a condition after starting of humidification; a first order lag component for generation of a first order lag at the time of change in bias amount of the fuel ratio; and an adder for addition of output of the bias setter and output of the first order lag component to calculate a fuel ratio, at which fuel is fed to the part of the combustion units, which are excellent in flame stabilizing performance, whereby a flow ratio of the fuel fed to the plural combustion units of the gas turbine combustor.

According to the invention, it is possible to realize a fuel control method and a fuel control device of a gas turbine combustor for advanced humid air turbines, in which method and device the gas turbine combustor can perform combustion stably with low NOx in the case where a transient change in a condition against generation of NOx and flame stability in the gas turbine combustor occurs after addition of moisture to a humidification tower of an advanced humid air turbine is started.

Other objects, features and advantages of the invention will become apparent from the following description of the embodiments of the invention taken in conjunction with the accompanying drawings.

BRIEF DESCRIPTION OF THE DRAWINGS

FIG. 2A is a partial construction drawing showing construction of a fuel nozzle mounted on the gas turbine combustor according to the first embodiment of the invention.

FIG. 2B is an enlarged view of a portion denoted by A in FIGS. 1 and 2A.

DESCRIPTION OF THE INVENTION

Fuel control method and a fuel control device of a gas turbine combustor, according to embodiments of the invention, mounted on an advanced humid air turbine will be described hereinafter with reference to the drawings.

Fuel control method and a fuel control device of a gas turbine combustor, according to a first embodiment of the invention, mounted on an advanced humid air turbine will be described hereinafter with reference to FIGS. 1 to 6.

Figure 1:
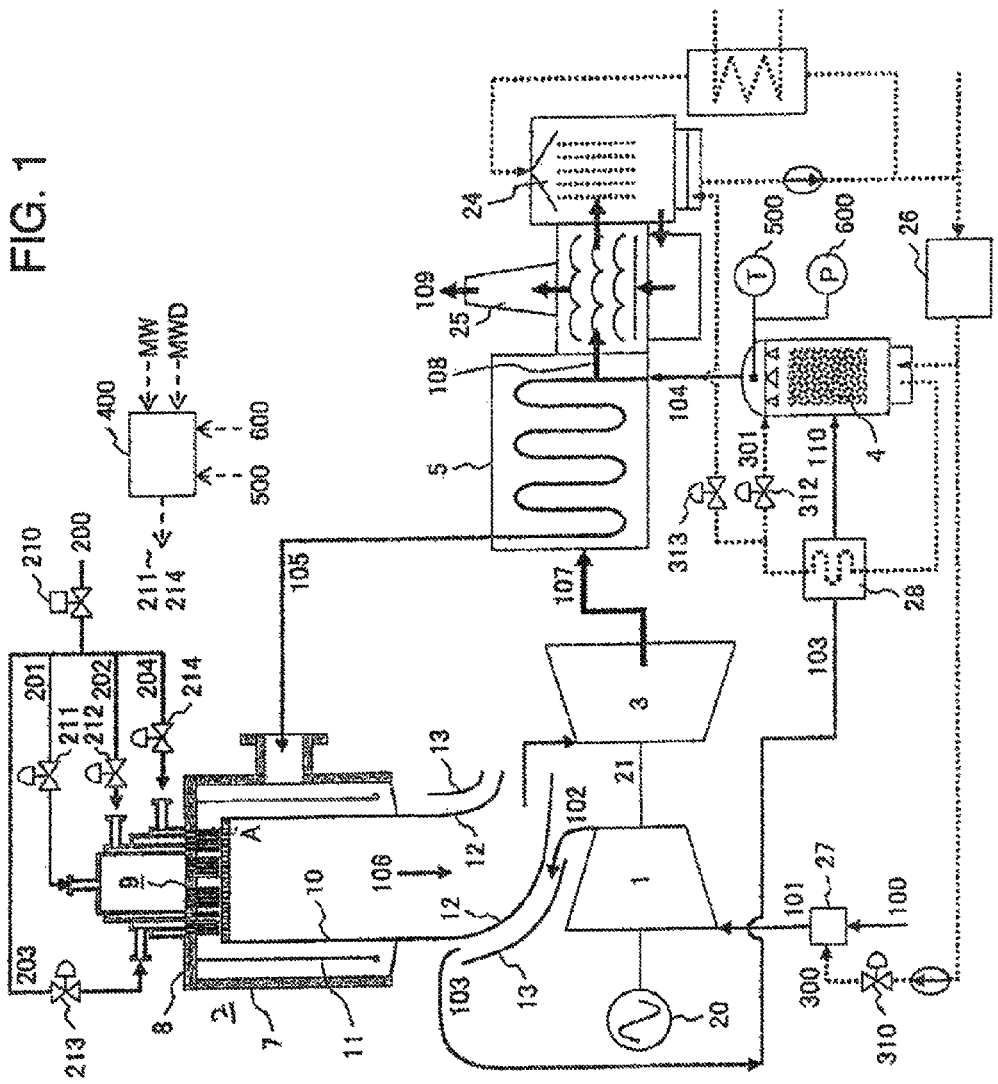
FIG. 1 is a system diagram showing a schematic construction of an advanced humid air turbine provided with a gas turbine combustor according to a first embodiment of the invention.

FIG. 1 is a system diagram showing whole construction of an advanced high humid air turbine, on which a gas turbine combustor according to a first embodiment of the invention is mounted.

An advanced high humid air turbine for power generation comprises a compressor 1 for compressing air, a gas turbine combustor 2, which uses compressed air compressed by the compressor 1 to burn fuel to generate combustion gas, a turbine 3 driven by the combustion gas generated in the gas turbine combustor 2, a humidification tower 4 for humidification of the compressed air compressed by the compressor 1 and fed to the gas turbine combustor 2, and a recuperator 5, in which water fed to the humidification tower 4 is heated by exhaust gases discharged from the turbine 3, and output of the turbine 3 rotates a generator 20 to obtain electric power.

The gas turbine combustor 2 is received in a combustor casing 7 and a combustor cover 8. A fuel nozzle 9 is mounted on a head of the gas turbine combustor 2 and a substantially cylindrical-shaped combustor liner 10 for separation of air for combustion and combustion gas is provided on a downstream side of the fuel nozzle 9.

Also, the advanced high humid air turbine is provided with a water atomization cooling unit 27, which sprays water 300 against a gas turbine intake air 100 at an inlet of the compressor 1. The water 300 fed to the water atomization cooling unit 27 is water, which is subjected to water treatment by a treatment unit 26 and flow of which is regulated by a spray water volume control valve 310.

High pressure air 102 obtained by using the compressor 1 to compress an intake air 101 (atmospheric pressure) after the water atomization cooling unit 27 sprays the water 300 flows through a gap between a transition piece 12 and a transition piece flow sleeve 13 to subject the transition piece 12 to convective cooling to be an extraction air 103.

The extraction air 103 is cooled near to 100° C. by an air cooler 28 to be humidification tower inflowing air 110 to be fed to the humidification tower 4.

The humidification tower 4 adds moisture to the humidification tower inflowing air 110 to make humid air 104. Humidification by a wetted wall column or a humidification tower is known as a method of air humidification.

In order to monitor soundness of the advanced humid air turbine, a thermometer 500 for measurement of humidification tower internal temperature and a pressure gauge 600 for measurement of humidification tower internal pressure are respectively provided in an upper part of the humidification tower 4.

Humid air 104, to which moisture is add by the humidification tower 4, is introduced into the recuperator 5 and heated in the recuperator 5 by heat exchange with exhaust gas 107, which is discharged from the turbine 3, to be high temperature air 105 to be injected into a combustor casing 7 of the gas turbine combustor 2.

Air flowing in the combustor casing 7 of the gas turbine combustor 2 passes through a substantially annular space outside the combustor liner 10 to flow toward a combustor head, and is used for convective cooling of the combustor liner 10 in the course.

Also, a part of the high temperature air 105 flows into the combustor liner 10 from a cooling hole provided on the combustor liner 10 and is used for film cooling. The remainder (36 in FIG. 2B) of high temperature air 105 flows into the combustor liner 10 from an air nozzle 32 described later to be used for combustion together with fuel, which is jetted from a fuel nozzle 31, to generate high temperature combustion gas 106 to be fed to the turbine 3.

The low pressure exhaust gas 107 having worked in the turbine 3 to be discharged from the turbine 3 performs heat recovery of thermal energy, which is held in the exhaust gas 107, in the recuperator 5 and then the exhaust gas 108 passes through a water recovery unit 24 positioned downstream of the recuperator 5 to be discharged as low temperature exhaust gas 109 to the atmosphere from an exhaust tower 25.

Also, moisture in the exhaust gas 108 is recovered by the water recovery unit 24 positioned downstream of the recuperator 5. In this embodiment, a system, in which water is sprayed into a gas duct to cause moisture in the exhaust gas 108 to be subjected to coagulation and fall to be recovered, is adopted as a system of water recovery.

Driving force obtained in the turbine 3 driven by the high temperature combustion gas 106 is transmitted to the compressor 1, which is connected through a shaft 21 to the turbine 3, and the generator 20. A part of the driving force rotates the compressor 1 to be used for pressurization of the intake air. Also, the generator 20 converts the driving force into electric power.

Water recovered from bottoms of the water recovery unit 24 and the humidification tower 4 is reused as spray water to the water recovery unit 24 or humidification water to the humidification tower 4.

An electric power generation MW of the generator 20, which corresponds to an output of the advanced humid air turbine for generation of electrical energy, is controlled by opening and closing of fuel flow control valves 211, 212, 214 for regulation of fuel flow fed to the gas turbine combustor 2. On the other hand, an extent of humidification of air fed to the gas turbine combustor 2 is controlled by opening and closing of a humidification tower feed valve 312 for regulation of humidification water volume to the humidification tower 4.

Figure 3:
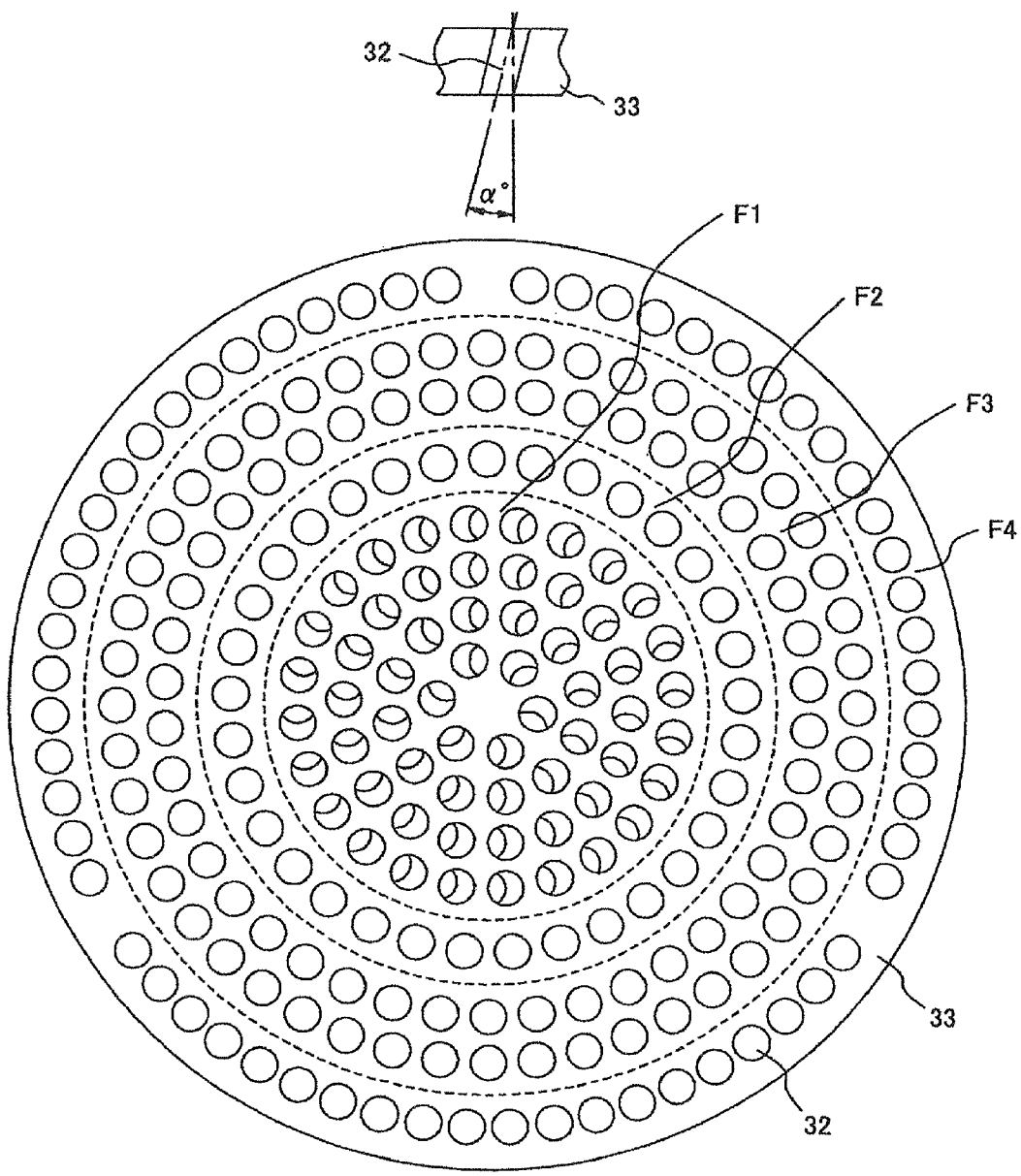
FIG. 3 is a front view showing an air nozzle plate, which constitutes a combustion unit mounted on the gas turbine combustor, according to the first embodiment, shown in FIGS. 2A and 2B.

FIG. 2A is a partially cross-sectional view showing the construction of the fuel nozzle 9, which constitutes a combustion unit mounted on the gas turbine combustor 2 according to the first embodiment of the invention, and FIG. 3 is a front view of an air nozzle plate 33.

In the gas turbine combustor 2 according to the embodiment, plural fuel nozzles 31 arranged annularly are mounted on a fuel nozzle header 30 of the combustor cover 8 as shown in FIGS. 2A and 3, and the air nozzle plate 33 provided with plural air nozzles 32 annularly arranged, which correspond to each of the fuel nozzles 31, is mounted to the combustor cover 8 through a support 34.

The plural fuel nozzles 31 and the plural air nozzles 32, respectively mounted corresponding to the fuel nozzles 31 are arranged annularly and substantially concentrically and constructed in a manner to form coaxial jets including a fuel jet 35 centrally of the air nozzle 32 formed on the air nozzle plate 33 and an air jet 36 flowing into the air nozzle 32 and surrounding the fuel jet 35 as shown in FIG. 2A.

Owing to the coaxial jet construction described above, fuel-air are not yet mixed in the air nozzles 32, so that fuel self-ignition is not generated even when combustion air is high in temperature as in an advanced humid air turbine, and the air nozzle plate 33 does not undergo melt loss, whereby it is possible to obtain the gas turbine combustor 2 having a high reliability.

Also, formation of the multiple coaxial jets increases fuel-air interfaces to accelerate mixing, so that it is possible to restrict an amount of NOx generated in the gas turbine combustor 2.

FIG. 3 is a front view showing the air nozzle plate 33, which constitutes the gas turbine combustor 2 according to the embodiment, as viewed from a downstream side of the combustor. In the gas turbine combustor 2 according to the embodiment, the multiple air nozzles 32 (and the fuel nozzles 31 paired with the air nozzles 32 while not shown) are arranged such that eight annular air nozzle rows are arranged concentrically from a radially internal circumference of the air nozzle plate 33 to a radially external circumference thereof.

Burners, which form a combustion unit of the gas turbine combustor 2, are grouped into F1 burners, which correspond to four rows (first to fourth rows) around a center to form a first group (F1) of combustion units, F2 burners, which correspond to a fifth row to form a second group (F2) of combustion units, F3 burners, which correspond to two rows (sixth and seventh rows) outside the former to form a third group (F3) of combustion units, and F4 burners, which correspond to an outermost circumference (eighth row) to form a fourth group (F4) of combustion units, and as shown in FIG. 2A, fuel systems are grouped and arranged so that fuel can be supplied from the fuel nozzles 31 through flanges (51 to 54) provided on the header 30 every group of F1 burners~F4 burners.

By adopting such grouped construction of fuel systems, fuel staging is enabled, in which the number of fuel nozzles for fuel supply is changed stepwise relative to change in fuel flow supplied to the gas turbine combustor 2, so that combustion stability in the gas turbine combustor 2 is heightened at the time of gas turbine partial load operation and reduction in NOx is enabled.

Further, the air nozzles 32 of the air nozzle plate 33, which constitute F1 burners forming central four rows (F1) of combustion units, are formed into oblique holes, which are angled ($\alpha°$ in FIG. 3, 15° in the embodiment) in a pitch circle tangential direction, to revolve a whole air flow passing through the air nozzles 32, and resulted circulating flow accomplishes flame stability.

Flame stability for F2 burners to F4 burners arranged on an externally circumferential side of F1 burners is accomplished by combustion heat of the central F1 burners. Accordingly, when humidification is started in the advanced humid air turbine and an air for combustion is increased in moisture content, F1 flame is improved in combustion stability by increasing fuel flow supplied to F1 burners of the gas turbine combustor 2 to provide a locally high-temperature portion.

Increase in F1 fuel brings about decrease in burner fuel flow for F2 burners and the following burners but flame stability is accomplished by combustion heat of F1 burners and so combustion stability is ensured for the whole burners.

Referring to characteristic graphs shown in FIGS. 4 and 5, an explanation will be given to method of operating an advanced humid air turbine, to which fuel control method and a fuel control device of the gas turbine combustor 2 according to the embodiment are applied.

Figure 4:
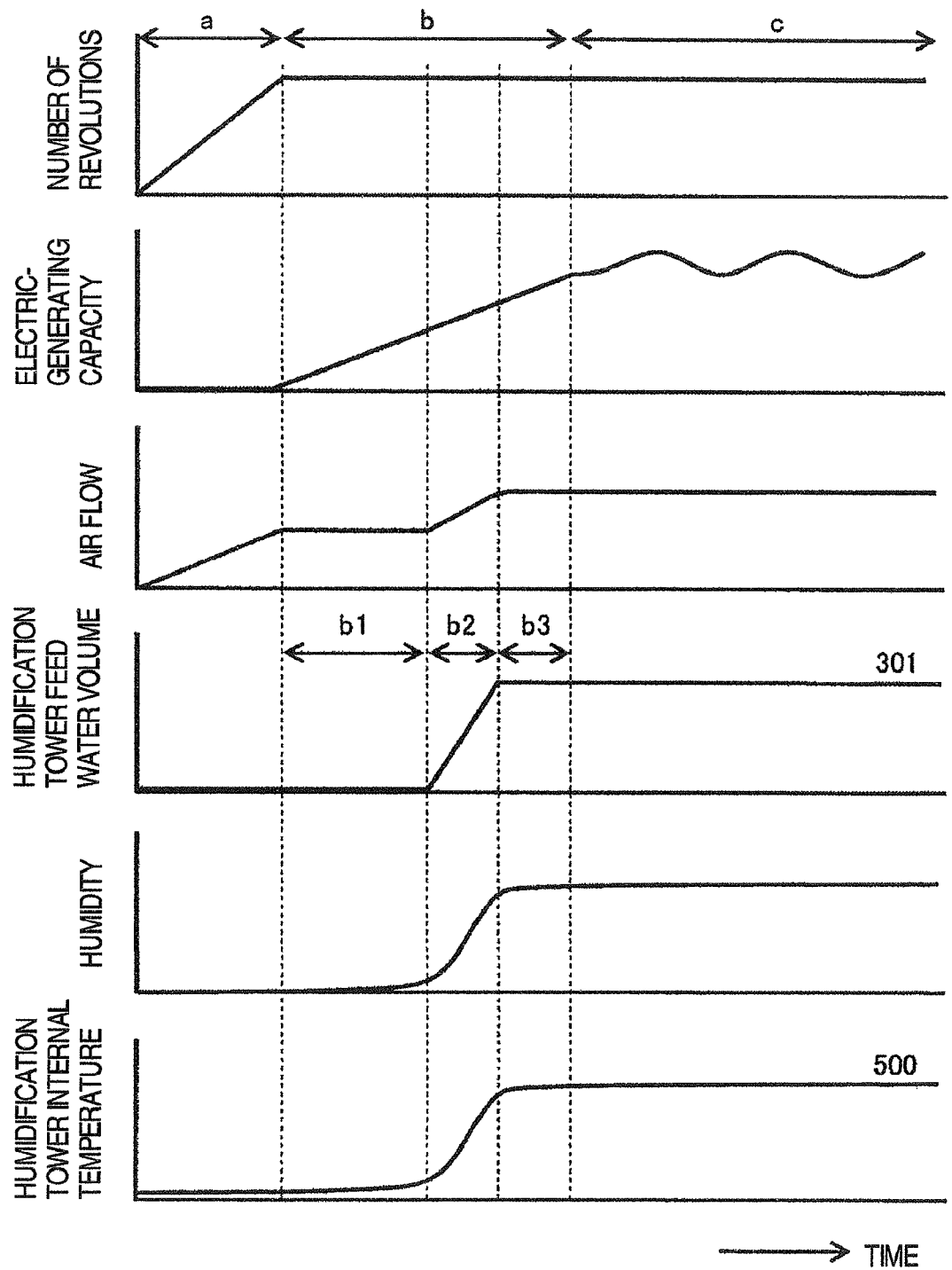
FIG. 4 is characteristic graphs depicting an example of operating method of an advanced humid air turbine provided with the gas turbine combustor according to the first embodiment of the invention.

In the characteristic graphs of operating method of an advanced humid air turbine in FIG. 4, an axis of abscissas indicates time elapsing from starting and an axis of ordinates indicates, in the order from above, number of revolutions, electric power generation, air flow, humidification tower feed water volume, humidity of humid air 104, and humidification tower internal temperature, respectively.

Figure 5:
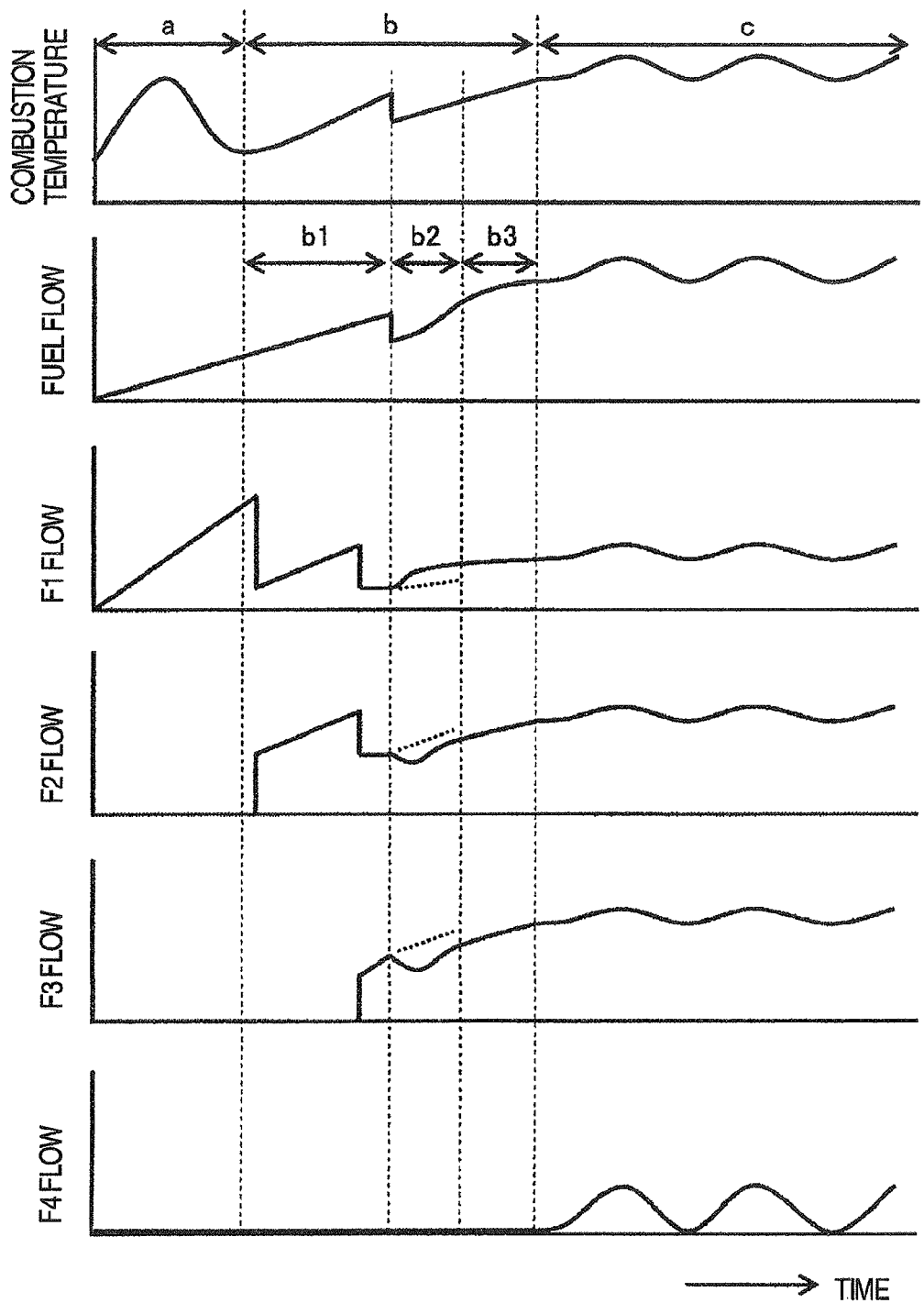
FIG. 5 is characteristic graphs depicting a further example of operating method of an advanced humid air turbine provided with the gas turbine combustor according to the first embodiment of the invention.

Also, for operating method of an advanced humid air turbine, an axis of abscissas in FIG. 5 indicates time elapsing from starting and an axis of ordinates schematically indicates, in the order from above, combustion temperature, whole fuel flow, and individual fuel flows (F1 flow to F4 flow) of the respective fuel systems, which supply fuel to F1 burners to F4 burners.

Also, in the characteristic graphs in FIGS. 4 and 5, time a indicates revolution speed increasing time from starting until rated revolution speed being reached, time b indicates load increasing time during gas turbine starting, and time c indicates load-following operating time after termination of starting. The load increasing time b is divided into moisture non-addition time b1 in the first half, moisture addition varying time b2, and moisture addition constant time b3.

In the method of operating the gas turbine combustor 2 with the fuel control device of the gas turbine combustor 2 according to the embodiment, at the time of ignition and speed up when fuel flow is comparatively small, a command from a control device 400 first brings about operation with combustion only in F1 burners positioned toward an axis of the gas turbine combustor 2 (that is, feeding fuel to a fuel system 201 in FIG. 2) and speed up is accomplished to the neighborhood of rated revolution speed no-load condition. Such single combustion in F1 burners is referred to ¼ mode in the subsequent description.

Subsequently, in the subsequent load increasing process (time b), fuel is charged into F2 burners mounted on an externally circumferential side of F1 burners of the gas turbine combustor 2 and operation is performed with F1+F2. That is, fuel is supplied to the fuel systems 201, 202 and a command from the control device 400 regulates opening degrees of the flow control valves 211 to 214, respectively, mounted in the fuel systems 201, 202 to thereby control respective fuel flows. This state is referred to ²/₄ mode.

Subsequently, a state, in which fuel is supplied to a fuel system 203 for charging of fuel into F3 burners mounted on an externally circumferential side of F2 burners of the gas turbine combustor 2 and F3 burners are ignited, is referred to ¾ mode. In the process up to this state, moisture is not added to the humidification tower 4 of the advanced humid air turbine (b1). That is, a humidification tower feed water valve 311 for regulation of water flow supplied to the humidification tower 4 of the advanced humid air turbine combustor shown in FIG. 1 is fully closed and water volume flowing through an economizer 12 mounted downstream of the recuperator 5 is controlled by the opening degree of a humidification tower bypass valve 312.

Also, for an increase in fuel flow in this course, fuel flows supplied to F1 burners, F2 burners, and F3 burners are controlled by regulating the opening degrees of the flow control valves 211, 212, 213 so as to increase an electric power generation of the gas turbine according to load increase rate determined in a starting plan of the gas turbine. Also, fuel flows distributed to the fuel systems 201 to 203 for supplying to F1 burners, F2 burners, and F3 burners are supplied at ratios, which are determined so that combustion in the gas turbine combustor 2 is made stable and NOx as generated is made minimum.

In the fuel control method and the fuel control device of the gas turbine combustor 2 according to the embodiment, addition of moisture to the humidification tower 4 of the advanced humid air turbine is started in ¾ mode. A humidification starting command opens the air cooler side humidification tower bypass valve 312 and so feed water of flow corresponding to the opening degree is injected into the humidification tower 4 (time b2). Simultaneously, an air cooler side humidification tower bypass valve 313 is decreased in opening degree and finally put in a fully closed state while being controlled so that water volume flowing through the air cooler 28 becomes a predetermined value.

Thereafter, by controlling the opening degree of the air cooler side humidification tower feed water valve 312, regulation is accomplished so that water volume flowing through the air cooler 28 becomes a predetermined value (time b2 to b3).

At this time, fuel flow is controlled so that electric power generation of the gas turbine is increased according to the load increasing rate determined in the starting plan of the gas turbine. Since F1 fuel plays a main role in ensuring combustion stability, it is required to be set so that a rate of F1 flow to a whole fuel flow is increased after starting of humidification as compared with that before starting of humidification.

In order to determine a rate of F1 flow being optimum for ensuring combustion stability, determination based on F1 combustion temperature is effective. Combustion temperature can be calculated from combustion air temperature, combustion air humidity, and a ratio of fuel flow and air flow (fuel-air ratio).

From test results obtained by the inventors of the present application in a pilot plant of an advanced humid air turbine, it has been found that the humid air 104 is in a saturated state. Here, with the fuel control device 400 of the gas turbine combustor 2 according to the embodiment, the humid air 104 is in a saturated state at humidification tower internal temperature 500, and so humidity of the humid air 104 is indirectly found. When pressure of humid air 104 is above saturated vapor pressure, combustion air humidity is found from the following formula (1);

$$Hm(vol\ \%) = P_{sat}/P_{total} \times 100, \quad (1)$$

where, Hm (vol %): humidity, $P_{total}$: humidification tower internal pressure 600, and $P_{sat}$: saturated vapor pressure. Saturated vapor pressure can be found from steam tables.

That is, a saturated humidity calculator included in a F1 bias calculator 404, which constitutes the fuel control device 400, calculates combustion air temperature by means of the operation expression (1) on the basis of measured values of humidification tower internal temperature 500 and humidification tower internal pressure 600.

Since the F1 bias calculator 404 can calculate combustion temperature from combustion air temperature as calculated, a F1 bias 415, which is a F1 bias flow required for ensuring combustion stability, can be found by making comparison between combustion temperature found by calculation and F1 combustion temperature required for ensuring combustion stability of the gas turbine combustor 2.

The method of calculating combustion air humidity with the F1 bias calculator 404 in the fuel control device 400 of the gas turbine combustor 2 according to the embodiment is effective in calculation of combustion air humidity not only in time (time b3 in FIG. 4), during which the humidification tower feed water volume 301 supplied to the humidification tower 4 by the humidification tower feed water volume control valve 312 is constant, but also in time of several tens of second to several minutes (time b2 in FIG. 4), during which the humidification tower feed water volume 301 is varied until the humidification tower feed water volume control valve is opened to a specified opening degree from a fully closed state.

Accordingly, against a transient humidity change of air for combustion caused by change in the humidification tower feed water volume 301, combustion stability of the gas turbine combustor 2 can be ensured by calculating an appropriate F1 bias 415 by means of the F1 bias calculator 404.

At a point of time, when electric power generation or turbine exhaust gas temperature reaches a predetermined amount, starting of the advanced humid air turbine is completed and thereafter fuel flow increases or decreases according to increase and decrease in load to lead to load-following (time c). High load operation is accommodated mainly by increasing or decreasing fuel flows of F4 burners mounted on an outermost circumference of the gas turbine combustor 2.

At this time, since mixtures of fuel and air supplied to F4 burners mix with combustion gases of F1 to F3 burners to become high in temperature, the fuel proceeds in oxidation reaction to enable obtaining high combustion efficiency.

Also, since air distribution is set so that temperature after completion of combustion decreases below temperature, at which generation of NOx becomes remarkable, combustion is enabled, in which generation of NOx from F4 burners is made almost nil. Also, since the reaction is completed even when fuel charged into F4 burners is slight, continuous switchover of fuels is enabled to achieve improvement in operability.

Figure 6:
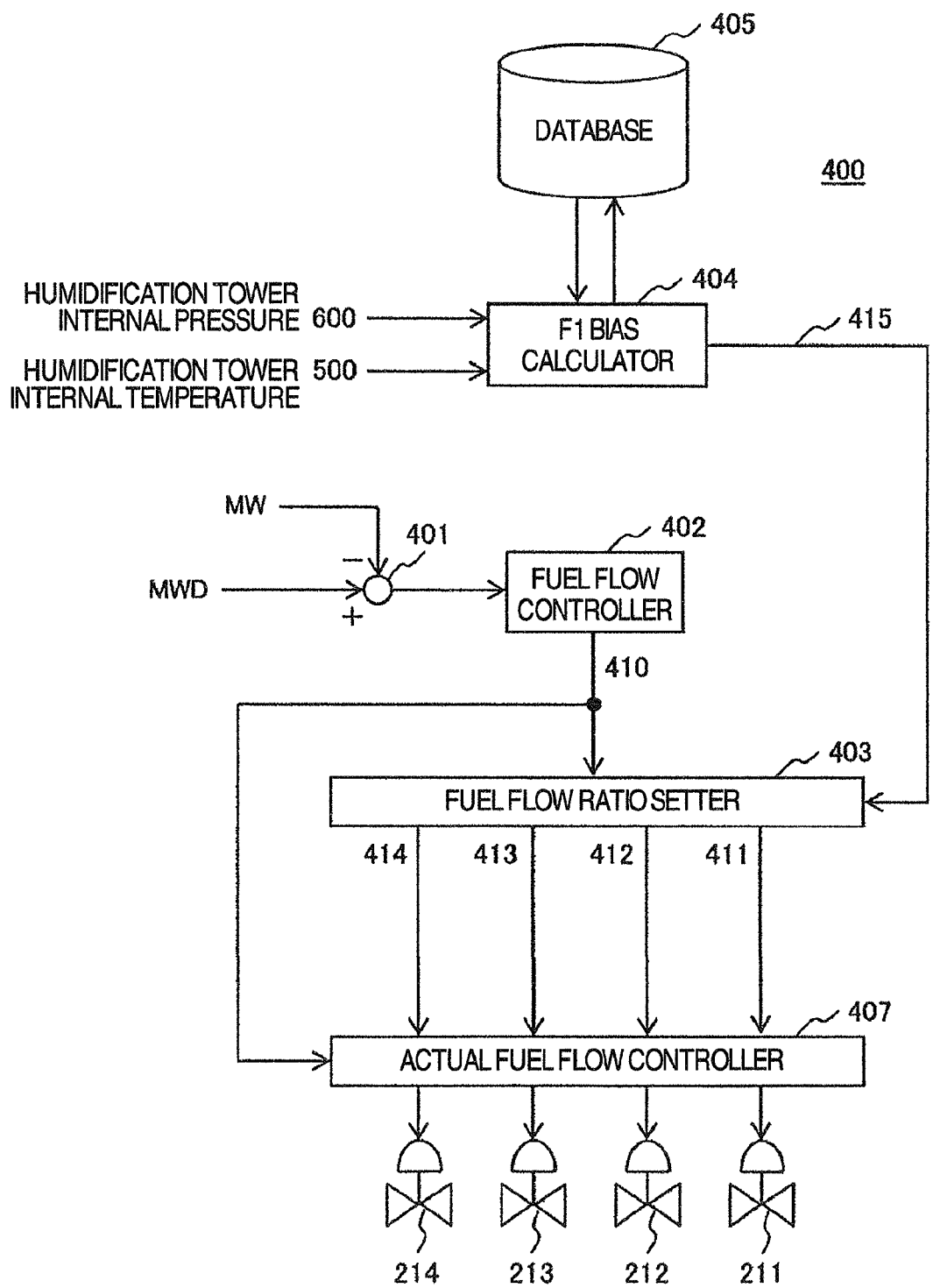
FIG. 6 is a control block diagram showing construction of a fuel control device with the gas turbine combustor according to the first embodiment of the invention.

FIG. 6 shows an example of control block of the fuel control device 400, which controls fuel of the gas turbine combustor 2 according to the embodiment.

As shown in FIG. 6, the fuel control device 400, which controls fuel of the gas turbine combustor 2 according to the embodiment, comprises a subtractor 401, a fuel flow controller 402, a fuel flow ratio setter 403, a F1 bias calculator 404, a database 405, and an actual fuel controller 407.

In the fuel control device 400, the subtractor 401 finds difference between a load command MWD, which is given in a manner to follow a predetermined electric power generation increasing rate, and an actual electric power generation MW, and on the basis of that difference between the load command MWD and the actual electric power generation MW, which is found by the subtractor 401, the fuel flow controller 402 calculates fuel flow command value 410 supplied to the gas turbine combustor 2.

On the basis of the fuel flow command value 410 calculated by the fuel flow controller 402, the fuel flow ratio setter 403 calculates respective fuel flow rates (411 to 414) of fuel supplied to F1 burners~F4 burners mounted on the gas turbine combustor 2.

On the other hand, in the F1 bias calculator 404, the saturated humidity calculator included in the F1 bias calculator 404 uses the operation expression (1) to calculate saturated humidity of combustion air on the basis of measured values of the humidification tower internal temperature 500 and the humidification tower internal pressure 600.

Subsequently, the F1 bias calculator 404 calculates combustion air temperature corresponding to the saturated humidity of combustion air as found by calculation to make comparison between the combustion air temperature as calculated and F1 combustion temperature required for ensuring combustion stability of the gas turbine combustor 2 to thereby find a F1 bias 415, which is a F1 bias flow required for ensuring combustion stability.

The database 405 is constructed to present to the F1 bias calculator 404 a value, which corresponds to the saturated humidity, out of steam table data required for finding saturated humidity of combustion air and F1 fuel flow data required for ensuring combustion stability of F1 with respect to combustion air temperature, combustion air humidity, and combustion air flow, as a bias value.

The fuel flow ratio setter 403 calculates respective fuel flow ratios (411 to 414) of fuel supplied to F1 burners to F4 burners mounted on the gas turbine combustor 2 while using, as an input value, the fuel flow command value 410 calculated by the fuel flow controller 402 and referring to a value of the F1 bias 415.

The actual fuel controller 407 inputs thereinto respective fuel flow ratios (411 to 414) of F1 burners to F4 burners and the fuel flow command value 410 calculated by the fuel flow controller 402 to calculate and output, respectively, flows of the respective fuel systems for F1 to F4 or valve opening degrees (211 to 214) to control valve opening degrees of the fuel flow control valves (211 to 214) for regulation of fuel flow fed to F1 burners to F4 burners mounted on the gas turbine combustor 2.

Thus the fuel control device 400 of the gas turbine combustor 2, according to the embodiment, shown in FIG. 6 enables realizing increase in F1 flow in time b2 shown by solid lines in the characteristic graphs in FIG. 5. Here, broken lines indicative of decrease in F1 flow in time b2 are F1 flows when the F1 bias 415 according to the embodiment is not applied, in which case F1 combustion temperature decreases to bring about a state, in which combustion stability of the gas turbine combustor 2 is injured.

In contrast, when increase in F1 flow in time b2 is achieved, as shown by solid lines in FIG. 5, by inputting the F1 bias 415, which is calculated by the F1 bias calculator 404 in the fuel control device 400 of the gas turbine combustor 2 according to the embodiment, into the fuel flow ratio setter 403 to control fuel supplied to the gas turbine combustor 2, it is possible to maintain F1 combustion temperature at a predetermined temperature with the result that it becomes possible to realize combustion stability of the gas turbine combustor 2.

In addition, even when humidification tower internal temperature 500 and humidification tower internal pressure 600 are replaced by measured values of temperature and pressure of humid air 104, it is possible in calculation of the F1 bias calculator 404 to find a saturated humidity of humid air 104.

Also, there is conceivable a case where a volume possessed by system, which includes the humidification tower bypass valve 313, piping, etc., brings about time-lag until moisture is actually added to combustion air after the starting of moisture addition. At this time, by estimating actual combustion air temperature, taking first order time-lag into consideration, for combustion air humidity found from humidification tower internal temperature 500 and humidification tower internal pressure 600 by calculation in the F1 bias calculator 404, it is possible to make reduction in NOx and combustion stability compatible for the gas turbine combustor 2.

When a load on the gas turbine decreases, it is thought that a volume possessed by the system such as piping, etc. causes lag until combustion air humidity follows the humidification tower feed water volume 301 in the humidification tower 4, so that estimation of an actual combustion air humidity taking first order time-lag into consideration is especially effective.

According to the embodiment, it is possible to realize fuel control method and a fuel control device of a gas turbine combustor for advanced humid air turbines, in which method and device the gas turbine combustor can perform combustion stably with low NOx in the case where transient change in condition against generation of NOx and flame stability in the gas turbine combustor occurs after addition of moisture to a humidification tower of an advanced humid air turbine is started.

Figure 7:
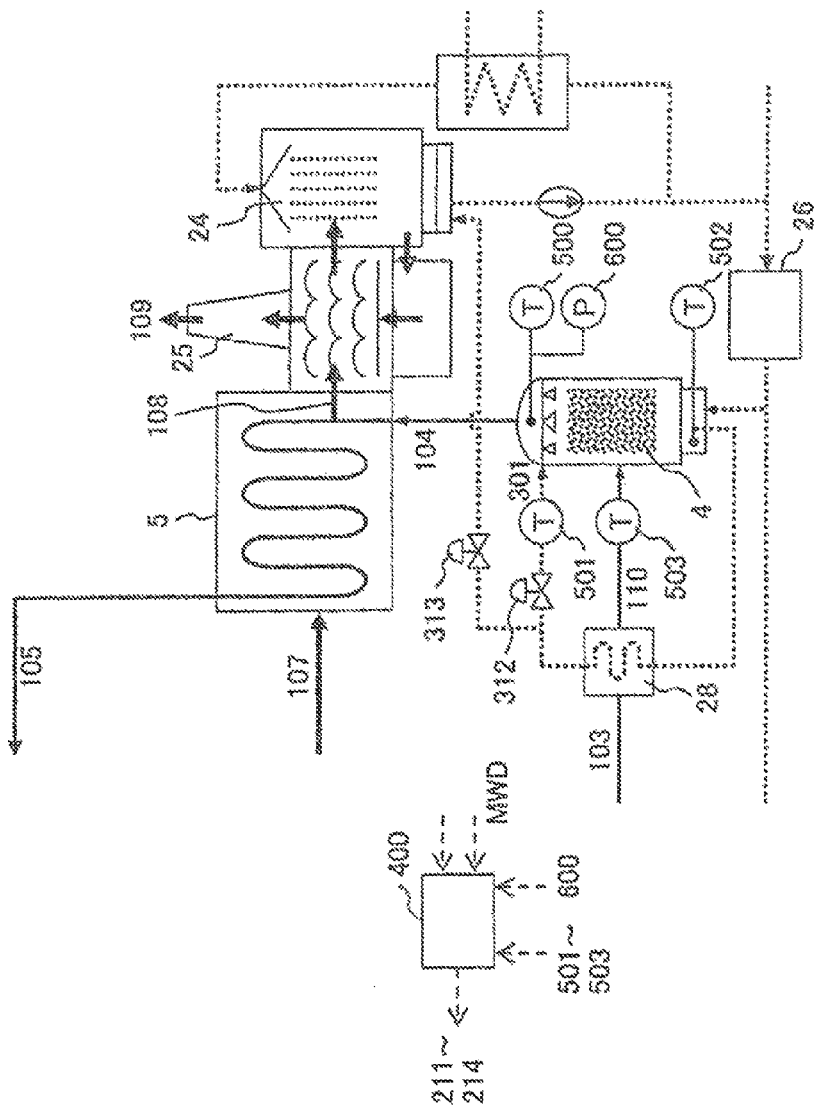
FIG. 7 is a system diagram showing a schematic construction of an advanced humid air turbine provided with a gas turbine combustor according to a second embodiment of the invention.
Figure 8:
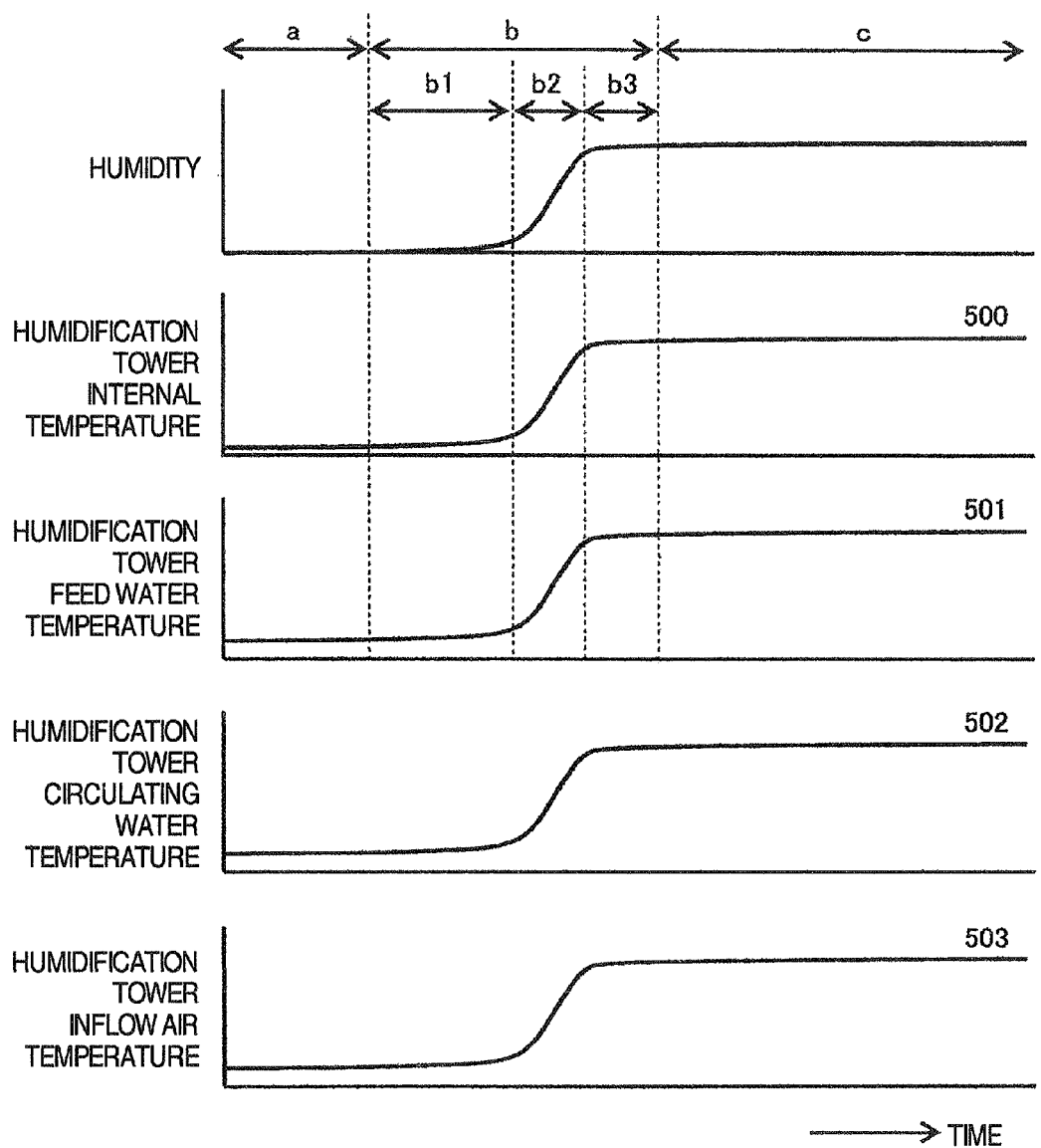
FIG. 8 is characteristic graphs depicting an example of operating method of an advanced humid air turbine provided with the gas turbine combustor according to the second embodiment of the invention.
Figure 9:
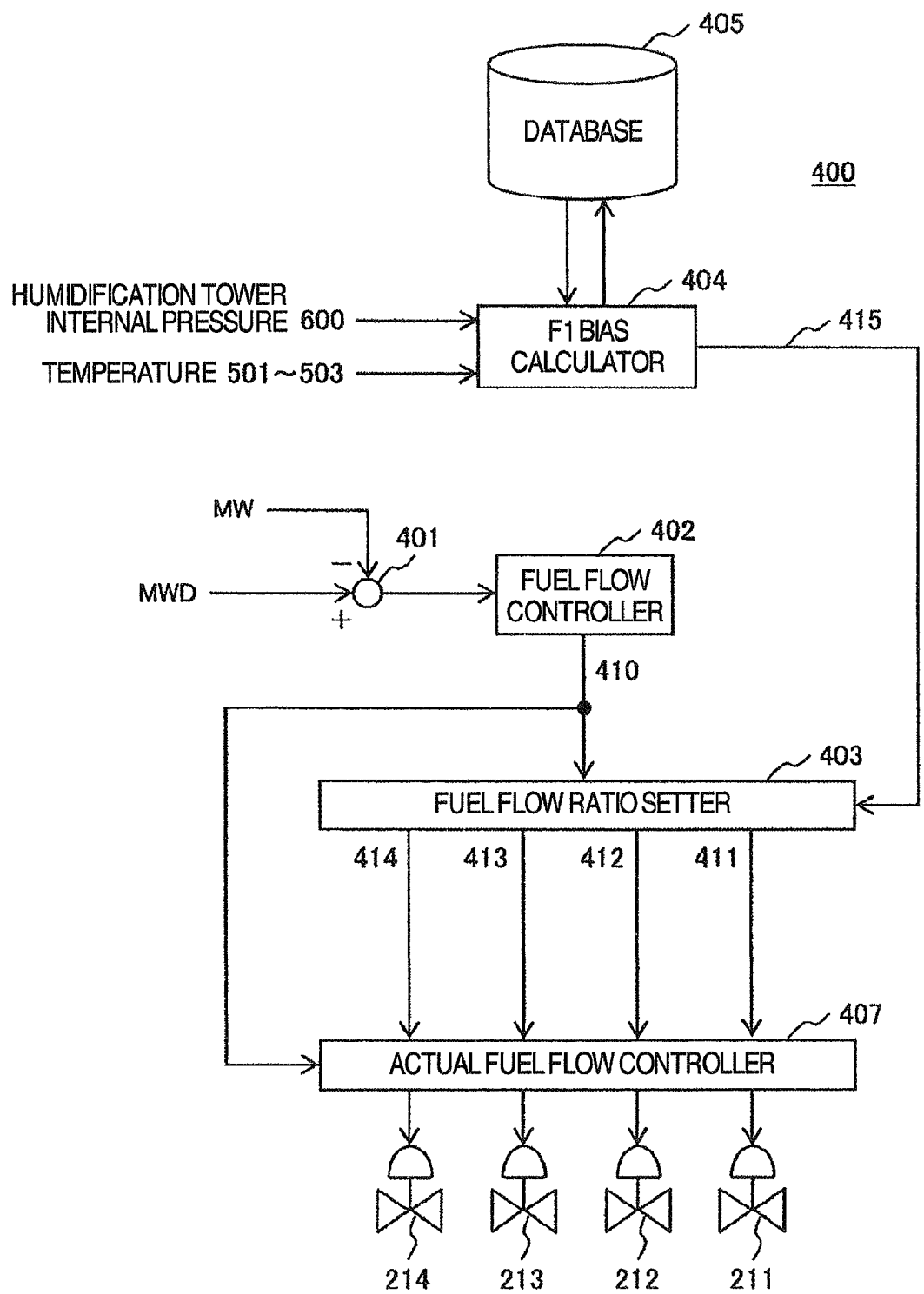
FIG. 9 is a control block diagram showing construction of a fuel control device with the gas turbine combustor according to the second embodiment of the invention.
Figure 10:
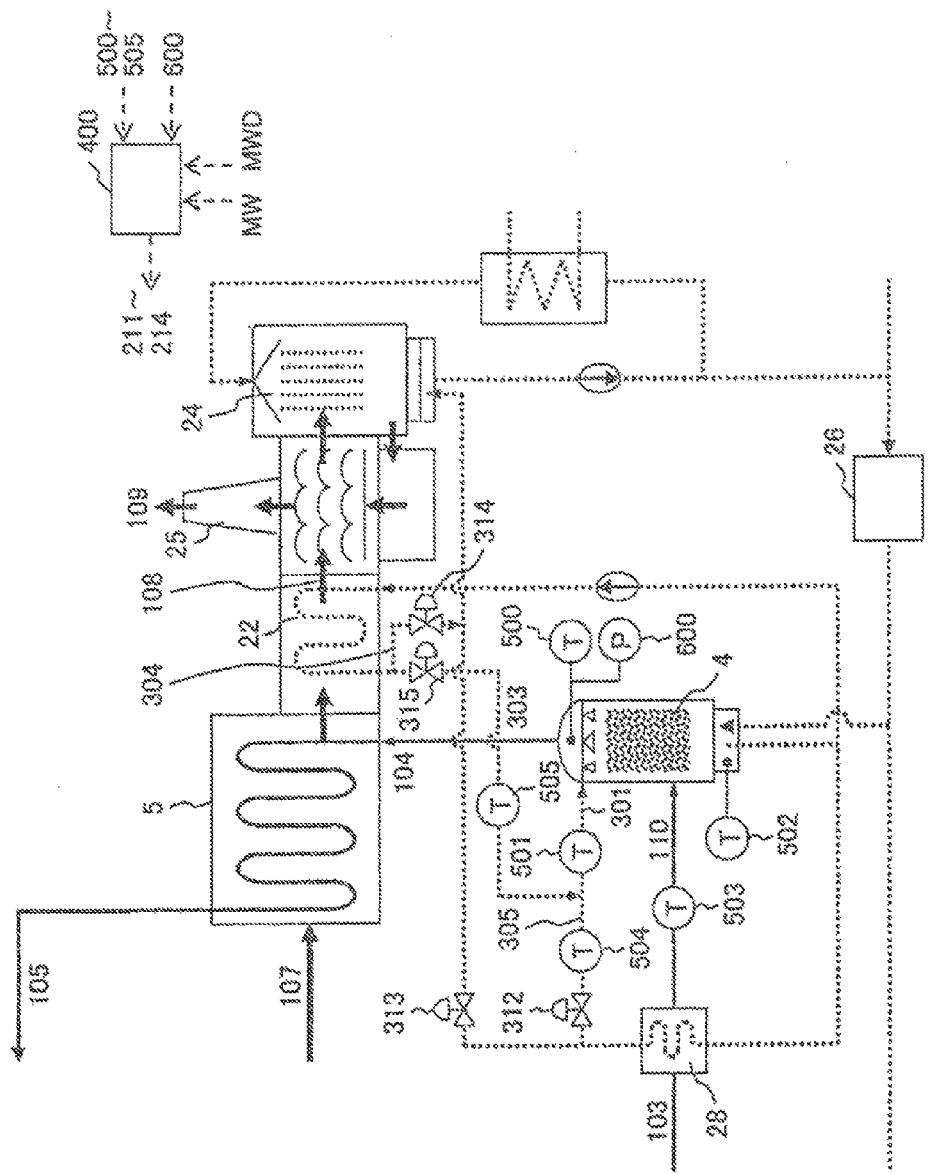
FIG. 10 is a system diagram showing a schematic construction of an advanced humid air turbine provided with a gas turbine combustor according to a third embodiment of the invention.

Referring to FIGS. 7 to 9, an explanation will be given to fuel control method and a fuel control device of a gas turbine combustor, according to a second embodiment, mounted in an advanced humid air turbine.

Since the fuel control device of the gas turbine combustor according to the embodiment is common in fundamental construction to the fuel control device of the gas turbine combustor according to the first embodiment, an explanation common to the both is omitted and only different portions will be described hereinafter.

A F1 bias calculator 404 in a fuel control device 400 of the gas turbine combustor 2 according to the second embodiment is different from that of the fuel control device of the gas turbine combustor 2 according to the first embodiment in that in place of a measured value of humidification tower internal temperature 500, saturated humidity of humid air 104 is found using one of measured values of humidification tower feed water temperature 501, humidification tower circulating water temperature 502, and humidification tower inflowing air temperature 503.

In an advanced humid air turbine, since measurement of the humidification tower feed water temperature 501, the humidification tower circulating water temperature 502, and the humidification tower inflowing air temperature 503 is essential to ensure soundness of a plant, saturated humidity of the humid air 104 is found from temperatures of respective parts.

Also, even in case of measuring a humidification tower internal temperature 500, there is an advantage in enabling making use, as a back-up therefore, of one of measured values of the humidification tower feed water temperature 501, the humidification tower circulating water temperature 502, and the humidification tower inflowing air temperature 503 in place of the humidification tower internal temperature 500.

FIG. 8 is characteristic graphs depicting an example of method of operating an advanced humid air turbine, to which method the fuel control method and the fuel control device of the gas turbine combustor according to the embodiment are applied, and the characteristic graphs of FIG. 8 put side by side and make a comparison among humidity, humidification tower internal temperature 500 (described again), humidification tower feed water temperature 501, humidification tower circulating water temperature 502, and humidification tower inflowing air temperature 503 shown in the characteristic graphs of the method of operating an advanced humid air turbine, to which method the fuel control method and the fuel control device of the gas turbine combustor according to the first embodiment shown in FIG. 1 are applied.

According to tests performed by the inventors of the present application with the use of a pilot plant of an advanced humid air turbine, the humidification tower feed water temperature 501, the humidification tower circulating water temperature 502, and the humidification tower inflowing air temperature 503 are proportional in temperature change to the humidification tower internal temperature 500 and time in the method of operating an advanced humid air turbine shown in FIGS. 4 and 5 of the first embodiment.

FIG. 9 shows an example of control block of the fuel control device 400, which controls a fuel of the gas turbine combustor 2 according to the embodiment.

In the control block of the fuel control device 400, which controls fuel of the gas turbine combustor 2 according to the embodiment shown in FIG. 9, a function of estimating a humidification tower internal temperature 500' from the humidification tower feed water temperature 501, the humidification tower circulating water temperature 502, and the humidification tower inlet air temperature 503 is added to a database 405 but the remaining construction is the same as that of the control block of the fuel control device 400 in the first embodiment.

With the fuel control device 400, which controls fuel of the gas turbine combustor 2 according to the embodiment, a saturated humidity calculator included in the F1 bias calculator 404 calculates saturated humidity of combustion air from the humidification tower internal temperature 500 or humidification tower internal temperature 500', which is estimated from one of the humidification tower feed water temperature 501, the humidification tower circulating water temperature 502, and the humidification tower inlet air temperature 503 in the database 405, and humidification tower internal pressure 600, and from results of calculation of a combustion air temperature calculated from the saturated humidity of combustion air, it is possible like the fuel control device 400 of the first embodiment to realize increase in F1 flow in time b2 shown by solid lines in the characteristic graphs of FIG. 5, which ensures combustion stability of the gas turbine combustor 2 also after addition of moisture to the humidification tower 4.

Also, it is possible in the same manner as that of the first embodiment to ensure combustion stability of the gas turbine combustor 2 against transient humidity change of air for combustion caused by change in the humidification tower feed water volume 301 supplied to the humidification tower 4.

According to the embodiment, it is possible to realize fuel control method and a fuel control device of a gas turbine combustor for advanced humid air turbines, in which method and device the gas turbine combustor can perform combustion stably with low NOx in the case where transient change in condition against generation of NOx and flame stability in the gas turbine combustor occurs after addition of moisture to a humidification tower of an advanced humid air turbine is started.

Referring to FIGS. 10 to 13, an explanation will be given to fuel control method and a fuel control device of a gas turbine combustor according to a third embodiment of the invention, mounted in an advanced humid air turbine.

Since the fuel control method and the fuel control device of the gas turbine combustor according to the third embodiment are common in fundamental construction to the fuel control method and the fuel control device of the gas turbine combustor according to the first embodiment, an explanation common to the both is omitted and only different portions will be described hereinafter.

A fuel control device 400 of the gas turbine combustor 2 according to the third embodiment is different from the fuel control device of the gas turbine combustor 2 according to the first embodiment in that an economizer 22 is mounted downstream of the recuperator 5 for heat recovery from the gas turbine exhaust gas 107. The economizer 22 has an advantage in that the advanced humid air turbine is improved in thermal efficiency by further recovering thermal energy from the exhaust gas 107 after passage through the recuperator 5 to heat water supplied to the humidification tower 4.

In the fuel control device 400 of the gas turbine combustor 2 according to the embodiment, at least one of the humidification tower internal temperature 500, the humidification tower feed water temperature 501, the humidification tower circulating water temperature 502, the humidification tower inflowing air temperature 503, the feed water temperature 504 on a side of an air cooler, and the feed water temperature 505 on a side of the recuperator, and the humidification tower internal pressure 600 are measured.

Figure 11:
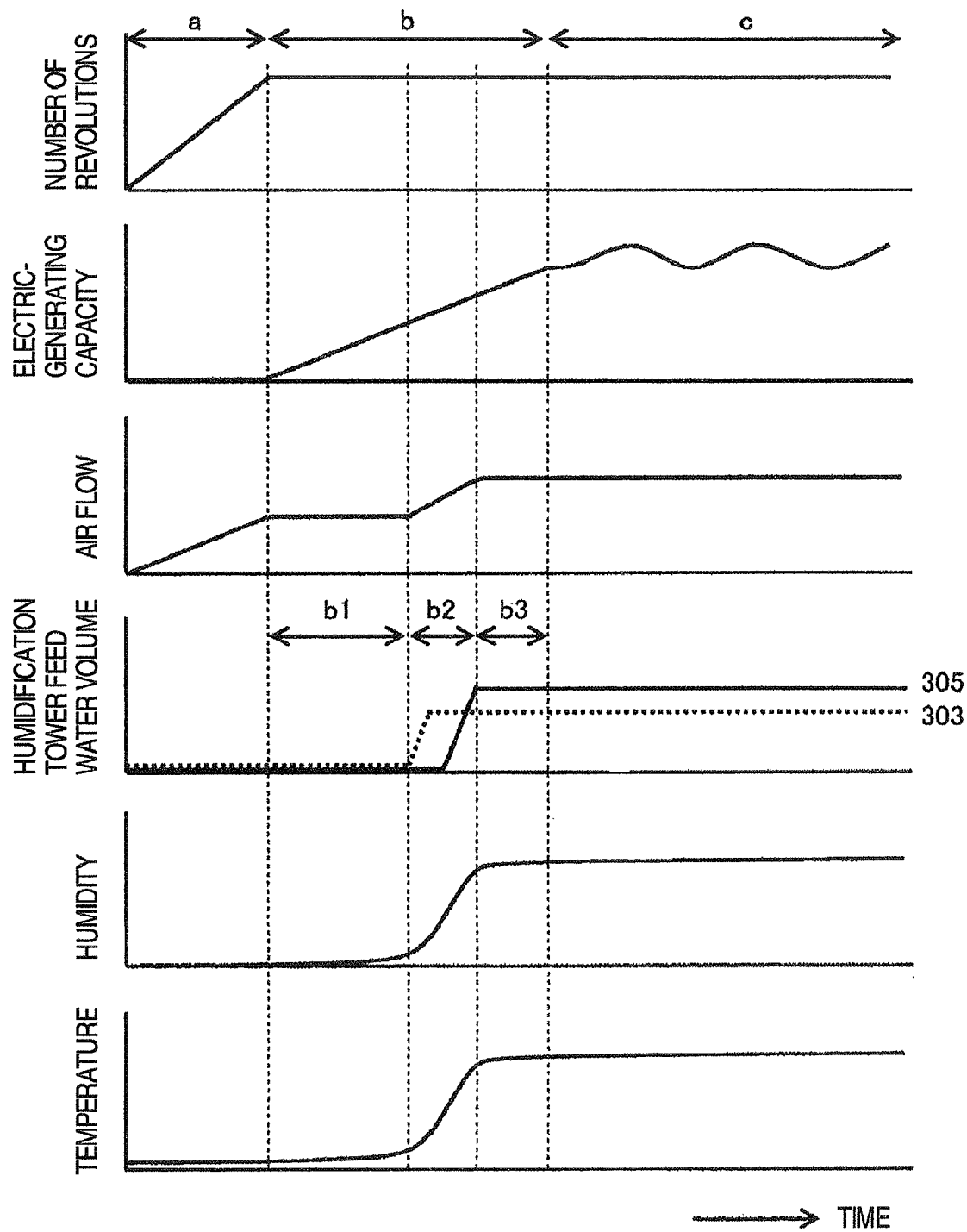
FIG. 11 is characteristic graphs depicting an example of operating method of an advanced humid air turbine provided with the gas turbine combustor according to the third embodiment of the invention.
Figure 12:
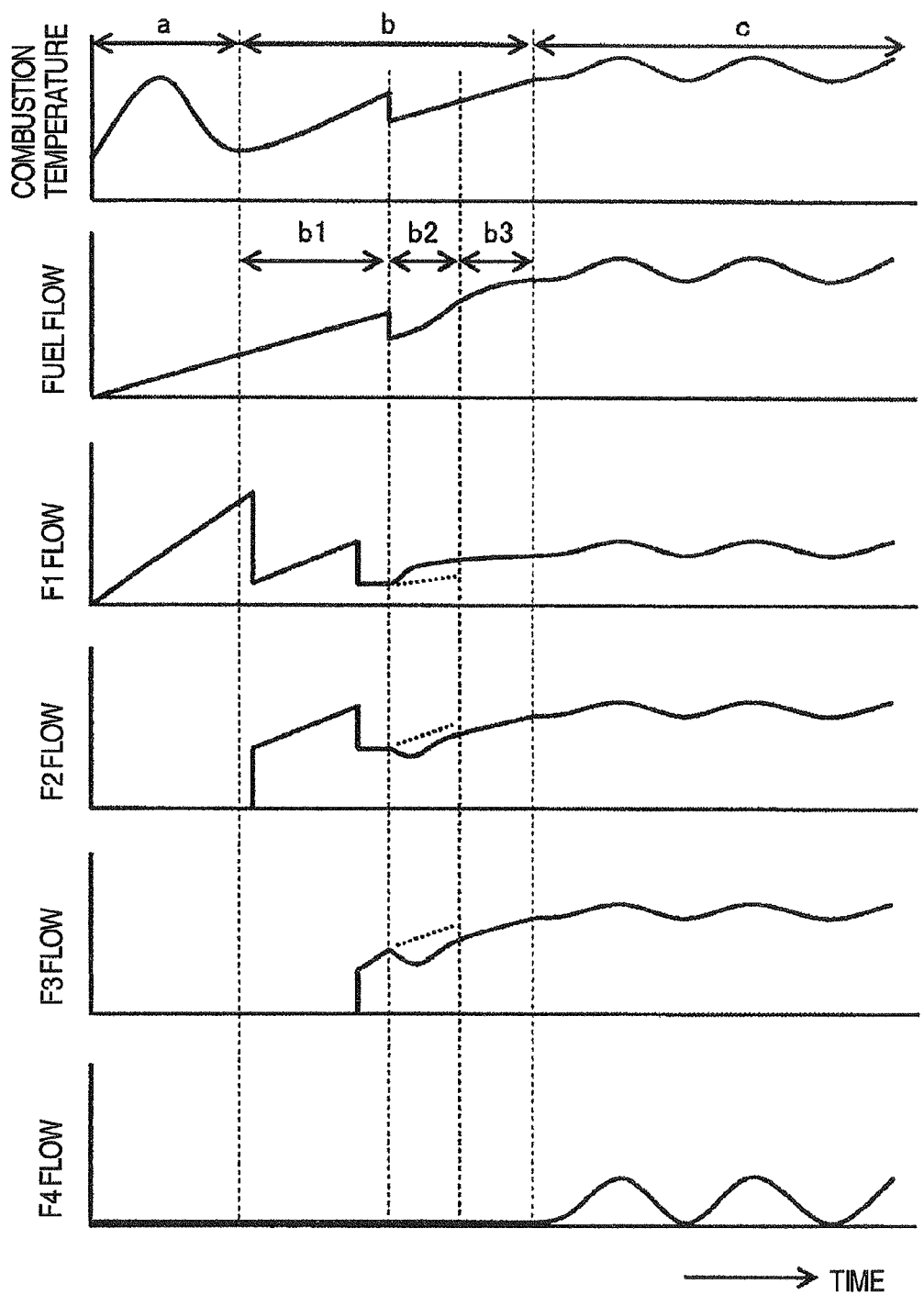
FIG. 12 is characteristic graphs depicting a further example of operating method of an advanced humid air turbine provided with the gas turbine combustor according to the third embodiment of the invention.

Referring to FIGS. 11 and 12, an explanation will be given to characteristic graphs depicting an example of method of operating an advanced humid air turbine, to which method the fuel control method and the fuel control device of the gas turbine combustor 2 according to the embodiment are applied.

In the characteristic graphs in FIG. 11, an axis of abscissas indicates time elapsing from starting and an axis of ordinates indicates, in the order from above, number of revolutions, electric power generation, air flow, humidification tower feed water volume (humidification tower feed water volume 303 on a side of the economizer and humidification tower feed water volume 305 on a side of an air cooler), humidity of humid air 104, humidification tower internal temperature 500, humidification tower feed water temperature 501, humidification tower circulating water temperature 502, humidification tower inflowing air temperature 503, air cooler side feed water temperature 504, and economizer side feed water temperature 505, respectively, in the same manner as the characteristic graphs in FIG. 4.

Hereupon, it has been found from experiments of a pilot plant of an advanced humid air turbine performed by the inventors of the present application that humidification tower internal temperature 500, humidification tower feed water temperature 501, humidification tower circulating water temperature 502, humidification tower inflowing air temperature 503, air cooler side feed water temperature 504, and economizer side feed water temperature 505 are changed in temperature relative to time in the same manner, and so these temperatures are shown together.

Also, in the characteristic graphs in FIG. 12, an axis of abscissas schematically indicates time elapsing from starting in the same manner as that in the characteristic graphs in FIG. 11 and an axis of ordinates schematically indicates, in the order from above, combustion temperature, fuel flow, and individual fuel flows of the respective systems for F1 to F4. Also, time a indicates revolution speed increasing time from starting until rated revolution speed being reached, time b indicates load increasing time during starting of the gas turbine, and time c indicates load-following operating time after termination of starting. The load increasing time b is divided into moisture non-addition time b1 in the first half, moisture addition varying time b2, and moisture addition constant time b3.

Unlike the characteristic graphs showing the method of operating the advanced humid air turbine in the first embodiment, since the advanced humid air turbine in this embodiment comprises two feed water systems, which join to feed water to the humidification tower 4, moisture addition varying time b2 is such that after feed water 303 on the side of the economizer is added, feed water 305 on the side of the air cooler is added. Procedure of operation of the advanced humid air turbine until addition of moisture to the humidification tower 4 is started is the same as that in the first embodiment.

In the method of operating the advanced humid air turbine in this embodiment, an economizer side humidification tower feed water valve 315 is opened by means of a humidification starting command and so feed water of flow corresponding to the opening degree is injected into the humidification tower 4. Simultaneously, an economizer bypass valve 314 is decreased in opening degree and finally put in a fully closed state while being controlled so that water volume flowing through the economizer 22 becomes a predetermined value. Thereafter, by controlling the opening degree of the economizer side humidification tower feed water valve 315, regulation is accomplished so that water volume flowing through the economizer 22 becomes a predetermined value. Consecutively, the air cooler side humidification tower bypass valve 312 is opened and so feed water of flow corresponding to the opening degree is injected into the humidification tower 4. Simultaneously, an air cooler bypass valve 313 is decreased in opening degree and finally put in a fully closed state while being controlled so that water flow through the air cooler 28 becomes a predetermined value. Thereafter, by controlling the opening degree of the air cooler side humidification tower feed water valve 312, regulation is accomplished so that water volume flowing through the air cooler 28 becomes a predetermined value (time b2 to b3).

Also in the embodiment, in order to find F1 fuel flow required for ensuring combustion stability of the gas turbine combustor 2 after humidification by the humidification tower 4, a saturated humidity calculator included in a F1 bias calculator 404 provided on the fuel control device 400 is used to find saturated humidity of combustion air. As described in the first embodiment, humidity of humid air 104 can be found from humidification tower internal temperature 500 and humidification tower internal pressure 600.

Alternatively, in the fuel control device 400, which controls fuel of the gas turbine combustor 2 according to the embodiment, a saturated humidity calculator included in the F1 bias calculator 404 provided on the fuel control device 400 may estimate, in the same manner as in the second embodiment, a humidification tower internal temperature 500' from one of measured values of humidification tower feed water temperature 501, humidification tower circulating water temperature 502, humidification tower inlet air temperature 503, air cooler side feed water temperature 504, and economizer side feed water temperature 505, saturated humidity of humid air 104 (combustion air humidity) may be calculated from humidification tower internal temperature 500' as estimated and humidification tower internal pressure 600, and combustion temperature may be calculated from the combustion air humidity as calculated.

As a result, like the fuel control devices 400 of the gas turbine combustors 2 of the first embodiment and the second embodiment, it is possible to realize increase in F1 flow in time b2 shown by solid lines in the characteristic graphs of FIG. 5, which ensures combustion stability of the gas turbine combustor 2 also after addition of moisture to the humidification tower 4.

When an economizer 28 is provided like the advanced humid air turbine, to which the fuel control device 400 of the gas turbine combustors 2 according to the embodiment is applied, an advantage is presented that fuel control is enabled by water temperature measurement of a water system of the economizer 28 in addition to water temperature measuring locations in the second embodiment and so an option in measuring locations is widened.

Figure 13:
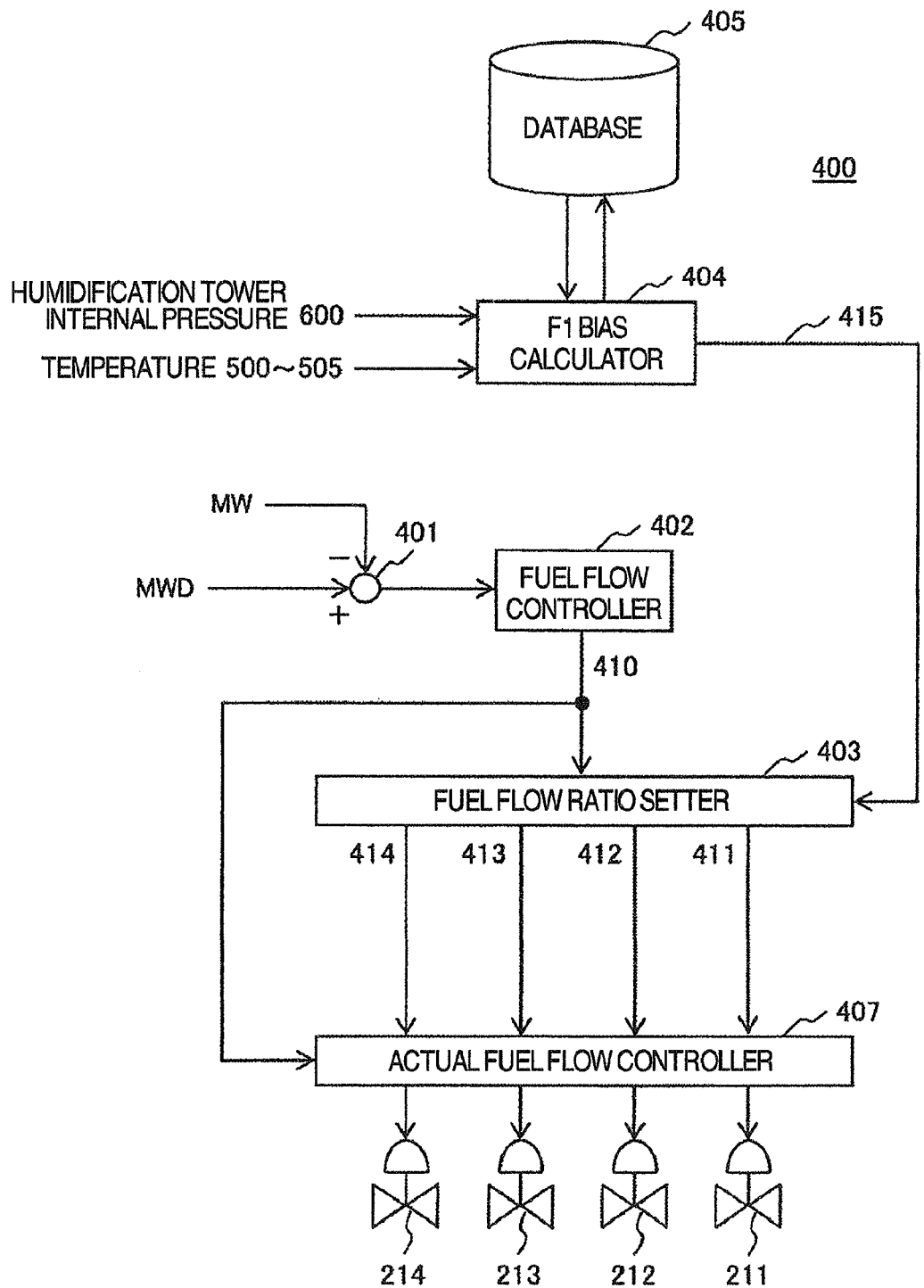
FIG. 13 is a control block diagram showing construction of a fuel control device with the gas turbine combustor according to the third embodiment of the invention.

In a control block of the fuel control device 400, which controls fuel of the gas turbine combustor 2, according to the embodiment, shown in FIG. 13, saturated humidity of combustion air is calculated from a humidification tower internal temperature 500', which is estimated from one of values of humidification tower internal temperature 500 or humidification tower feed water temperature 501 in the database 405, humidification tower circulating water temperature 502, humidification tower inlet air temperature 503, air cooler side feed water temperature 504, economizer side feed water temperature 505, and humidification tower internal pressure 600, and from results of calculation of combustion air temperature calculated from the saturated humidity of combustion air, it is possible like the fuel control devices 400 of the first embodiment and the second embodiment to realize increase in F1 flow in time b2 shown by solid lines in the characteristic graphs of FIG. 5, which ensures combustion stability of the gas turbine combustor 2 after addition of moisture to the humidification tower 4.

Also, it is possible like the first embodiment and the second embodiment to ensure combustion stability of the gas turbine combustor 2 against transient humidity change of air for combustion caused by change in the humidification tower feed water volume 301 supplied to the humidification tower 4.

In addition, the method of operating the high humid air utilization gas turbine after time b3 is reached is the same as that in the first embodiment.

While the embodiment has been described with respect to the case where the fuel control device of the gas turbine combustor according to the embodiment is applied to an advanced humid air turbine provided with the air cooler 28 and the economizer 22, the similar method of operating an advanced humid air turbine is possible also in the construction without an air cooler 28. In such case, it suffices to find humidity of humid air 104 (combustion air humidity) by means of humidification tower circulating water temperature 502, economizer side feed water temperature 505, and humidification tower feed water temperature 501 in addition to humidification tower internal temperature 500.

According to the embodiment, it is possible to realize fuel control method and a fuel control device of a gas turbine combustor for advanced humid air turbines, in which method and device the gas turbine combustor can perform combustion stably with low NOx in the case where transient change in condition against generation of NOx and flame stability in the gas turbine combustor occurs after addition of moisture to a humidification tower of an advanced humid air turbine is started.

Referring to FIGS. 14 to 21, an explanation will be given to fuel control method and a fuel control device of a gas turbine combustor, according to a fourth embodiment of the invention, mounted in an advanced humid air turbine.

Figure 14:
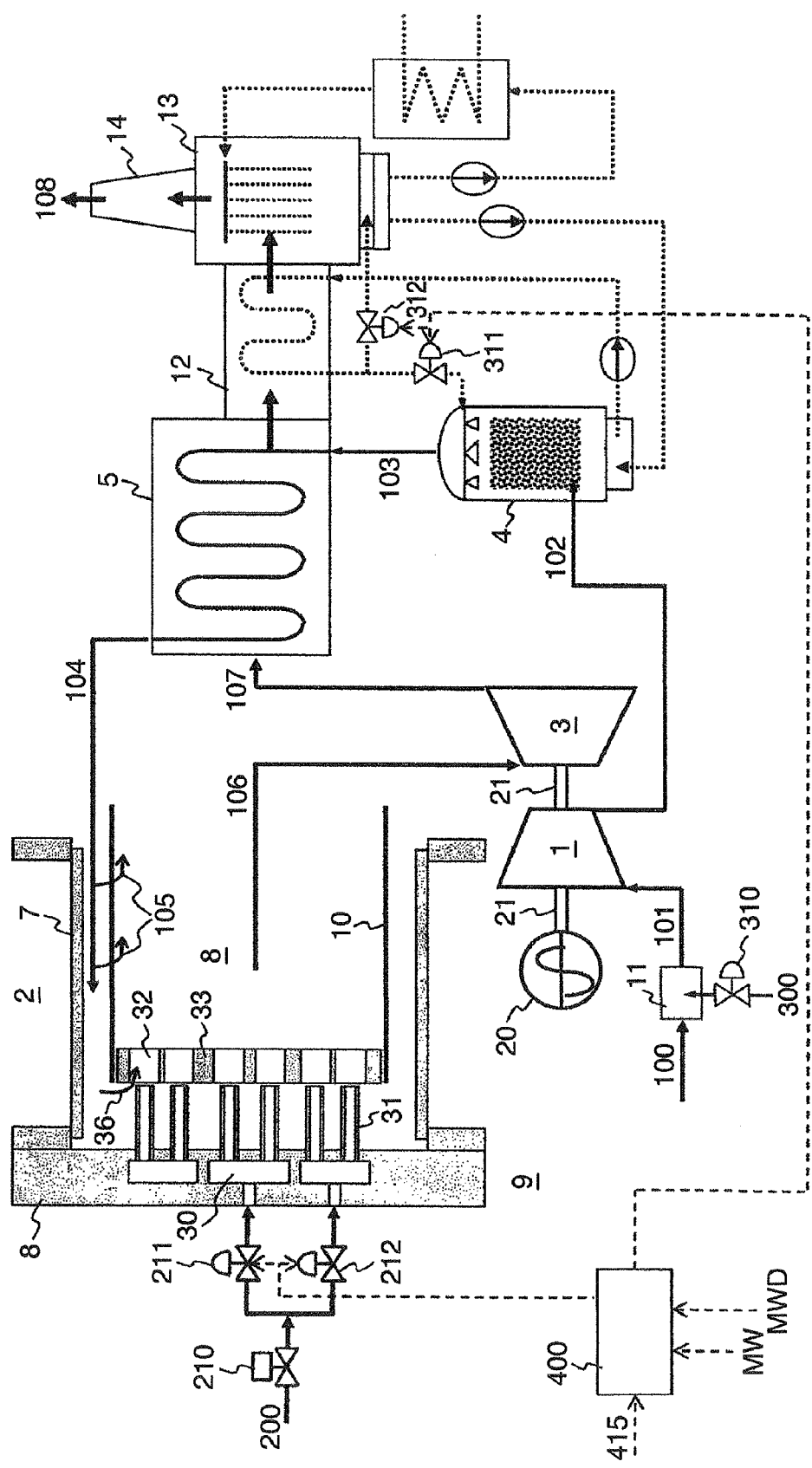
FIG. 14 is a system diagram showing construction of an advanced humid air turbine provided with a fuel control device of a gas turbine combustor according to a fourth embodiment of the invention.

FIG. 14 is a system diagram depicting the whole configuration of an advanced humid air turbine, to which a fuel control device of a gas turbine combustor according to the fourth embodiment of the invention is applied.

The advanced humid air turbine, to which the fuel control device of the gas turbine combustor according to the embodiment is applied, comprises the compressor 1 for air compression, the gas turbine combustor 2, in which compressed air compressed by the compressor 1 and fuel burn to generate high temperature combustion gas, the turbine 3 driven by combustion gas generated in the gas turbine combustor 2, the humidification tower 4, which humidifies the compressed air compressed by the compressor 1, and the recuperator 5, in which air humidified by the humidification tower 4 is heated by exhaust gases discharged from the turbine 3 to be supplied, as air for combustion, to the gas turbine combustor 2, and output of the turbine 3 rotates the generator 20 to provide electric power.

The gas turbine combustor 2 is received in the combustor casing 7 and the cover 8 of the combustor. The fuel nozzle 9 is provided centrally at an upstream end of the gas turbine combustor 2 and the substantially cylindrical-shaped combustor liner 10 for separation of unburned air and burned combustion gas is provided on a downstream side of the fuel nozzle.

Also, provided on the advanced humid gas turbine in the embodiment is a water atomization cooling unit 11, which sprays water 300 against gas turbine intake air 100 at an inlet of the compressor 1. Moisture is added in the humidification tower 4 to high pressure air 102, which is obtained by using the compressor 1 to compress air 101 (atmospheric pressure) after water spray, to make humid air 103. Humidification by a wet wall tower or a humidification tower is known as a method of air humidification.

Humid air 103, to which moisture is added in the humidification tower 4, is led to the recuperator 5 to be heated by heat exchange with turbine exhaust gases 107 (turbine outlet low pressure gas) to make high temperature air 104 after passage through the recuperator to be injected into the combustor casing 7.

Air flowing in the combustor casing 7 passes through a substantially annular space outside the combustor liner 10 to flow toward a combustor head, and is used for convective cooling of the combustor liner 10 in the course. Also, a part 105 of the air flows into the combustor liner 10 from a cooling hole provided on the combustor liner 10 and is used for film cooling. The remainder 36 of the air flows into the combustor liner 10 from air nozzles 32 described later to be used for combustion together with fuel, which is jetted from fuel nozzles 31, to make high temperature combustion gas 106 to be fed to the turbine 3.

A low pressure gas turbine exhaust gas 107 leaving the turbine 3 is subjected to heat recovery in the recuperator 5 and then passes through the economizer 12 and a water recovery unit 13 to be discharged as exhaust gas 118 from an exhaust tower 25. Also, moisture in combustion exhaust gas is recovered by the water recovery unit 13 positioned on the way. In this embodiment, a system, in which water is sprayed into a gas duct to cause moisture in gas to be subjected to coagulation and fall to be recovered, is adopted as a system of water recovery.

A driving force obtained in the turbine 3 is transmitted through the shaft 21 to the compressor 1 and the generator 20. A part of the driving force is used for pressurization of air in the compressor 1. Also, the driving force is converted into electric power in the generator 20.

Water recovered from bottoms of the water recovery unit 13 and the humidification tower 4 is reused as spray water to the water recovery unit 13 or humidification water to the humidification tower 4.

Electric power generation MW corresponding to output of the advanced humid air turbine power plant is controlled by opening and closing of fuel flow control valves (211, 212). On the other hand, extent of humidification of air is regulated by using a regulating valve 311 to control humidification water volume to the humidification tower 4.

Figure 15A:
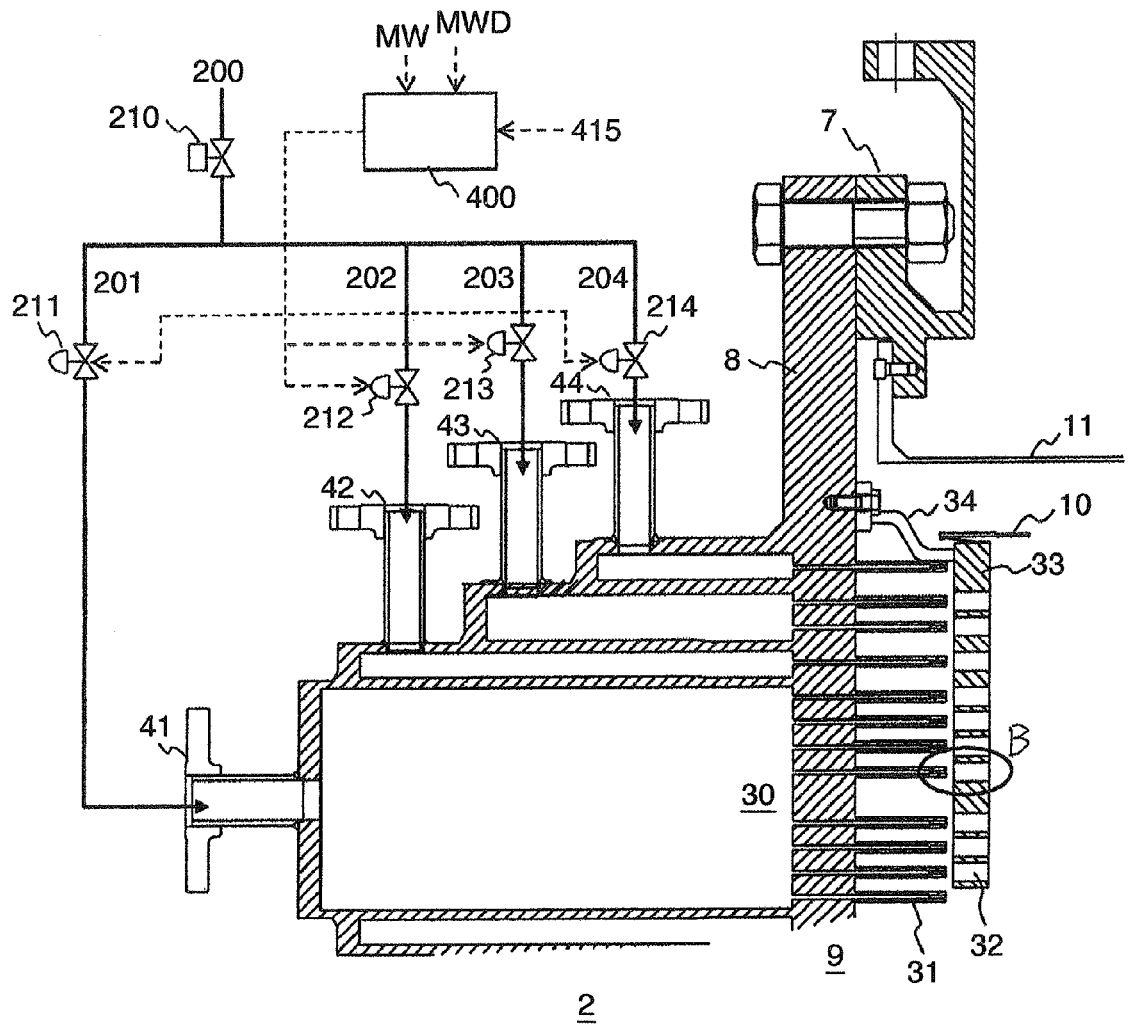
FIG. 15A is a view showing construction of a fuel nozzle mounted on a gas turbine combustor, to which the fuel control device of the gas turbine combustor according to the fourth embodiment of the invention is applied.

FIG. 15A is a partially cross-sectional view showing the construction of a fuel nozzle 9 provided on the gas turbine combustor 2, to which the fuel control device of the gas turbine combustor according to the embodiment is applied. Plural fuel nozzles 31 are mounted on the fuel nozzle header 30 of the combustor cover 8, which constitutes the gas turbine combustor 2, and the air nozzle plate 33 provided with plural air nozzles 32, each of which forms an air flow passage corresponding to each of the gas turbine combustors 2, is mounted through the support 34 to the combustor cover 8.

The pairs of the fuel nozzle 31 and the air nozzle 32 are arranged substantially concentrically to enable forming fuel jet 35 centrally and plural coaxial jets of air 36 therearound. Owing to the coaxial jet construction, fuel-air are not yet mixed in the air nozzles 32, so that fuel self-ignition is not generated even when combustion air is high in temperature as in an advanced humid air turbine, and the gas turbine combustor 2 can be made high in reliability.

Also, formation of the multiple small coaxial jets increases fuel-air interfaces to accelerate mixing, so that it is possible to restrict an amount of NOx as generated. Thus, in case of adopting the gas turbine combustor 2 for an advanced humid air turbine, it is possible to make reduction in NOx and combustion stability compatible.

FIG. 3 is a front view of the air nozzle plate 33, which constitutes the gas turbine combustor 2 according to the embodiment, as viewed from a downstream side of the combustor. In the gas turbine combustor 2 according to the embodiment, the plural air nozzles 32 (and the fuel nozzles 31 paired with the air nozzles 32 while not shown) are arranged such that eight annular air nozzle rows are arranged concentrically from a radially internal circumference of the air nozzle plate 33 to a radially external circumference thereof.

Figure 15B:
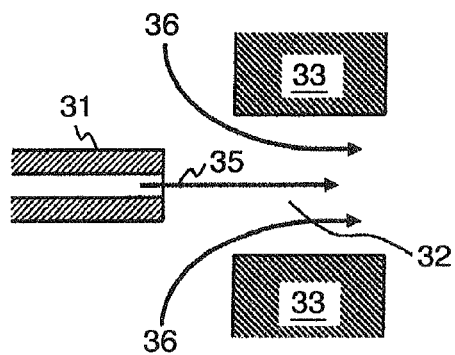
FIG. 15B is an enlarged view of a portion denoted by B in FIG. 15A.

Burners, which form combustion units of the gas turbine combustor 2, are grouped into F1 burners, which correspond to four rows (first to fourth rows) around a center to form a first group (F1) of combustion units, F2 burners, which correspond to a fifth row to forms a second group (F2) of combustion units, F3 burners, which correspond to two rows (sixth and seventh rows) outside the former to form a third group (F3) of combustion units, and F4 burners, which correspond to an outermost circumference (eighth row) to form a fourth group (F4) of combustion units, and as shown in FIG. 15, fuel systems are grouped and arranged so that fuel can be supplied from the fuel nozzles 31 through flanges (41 to 44) provided on the header 30 every group of F1 burners~F4 burners.

By adopting such grouped construction of fuel systems, fuel staging is enabled, in which the number of fuel nozzles for fuel supply is changed stepwise relative to change in fuel flow supplied to the gas turbine combustor 2, so that combustion stability in the gas turbine combustor 2 is heightened at the time of gas turbine partial load operation and reduction in NOx is enabled.

Further, the air nozzles 32 of the air nozzle plate 33, which constitute F1 burners forming central four rows (F1) of combustion units, are formed into oblique holes, which are angled ($\alpha°$ in FIG. 3, 15° in the embodiment) in a pitch circle tangential direction, to revolve a whole air flow passing through the air nozzles 32, and resulted circulating flow accomplishes flame stability.

Flame stability for F2 burners to F4 burners arranged on an externally circumferential side of F1 burners is accomplished by combustion heat of the central F1 burners. Accordingly, when humidification is started in the advanced humid air turbine and air for combustion is increased in moisture content, F1 flame is improved in combustion stability by increasing fuel flow supplied to F1 burners of the gas turbine combustor 2 to provide a locally high-temperature portion.

Increase in F1 fuel brings about decrease in burner fuel flow for F2 burners and the following burners but flame stability is accomplished by combustion heat of F1 burners and so combustion stability is ensured for the whole burners.

Referring to control characteristic graphs shown in FIG. 16 and depicting an example of method of operating an advanced humid air turbine system, an explanation will be given to method of operating the gas turbine combustor 2 with the fuel control device of the gas turbine combustor 2 of the embodiment.

Figure 16:
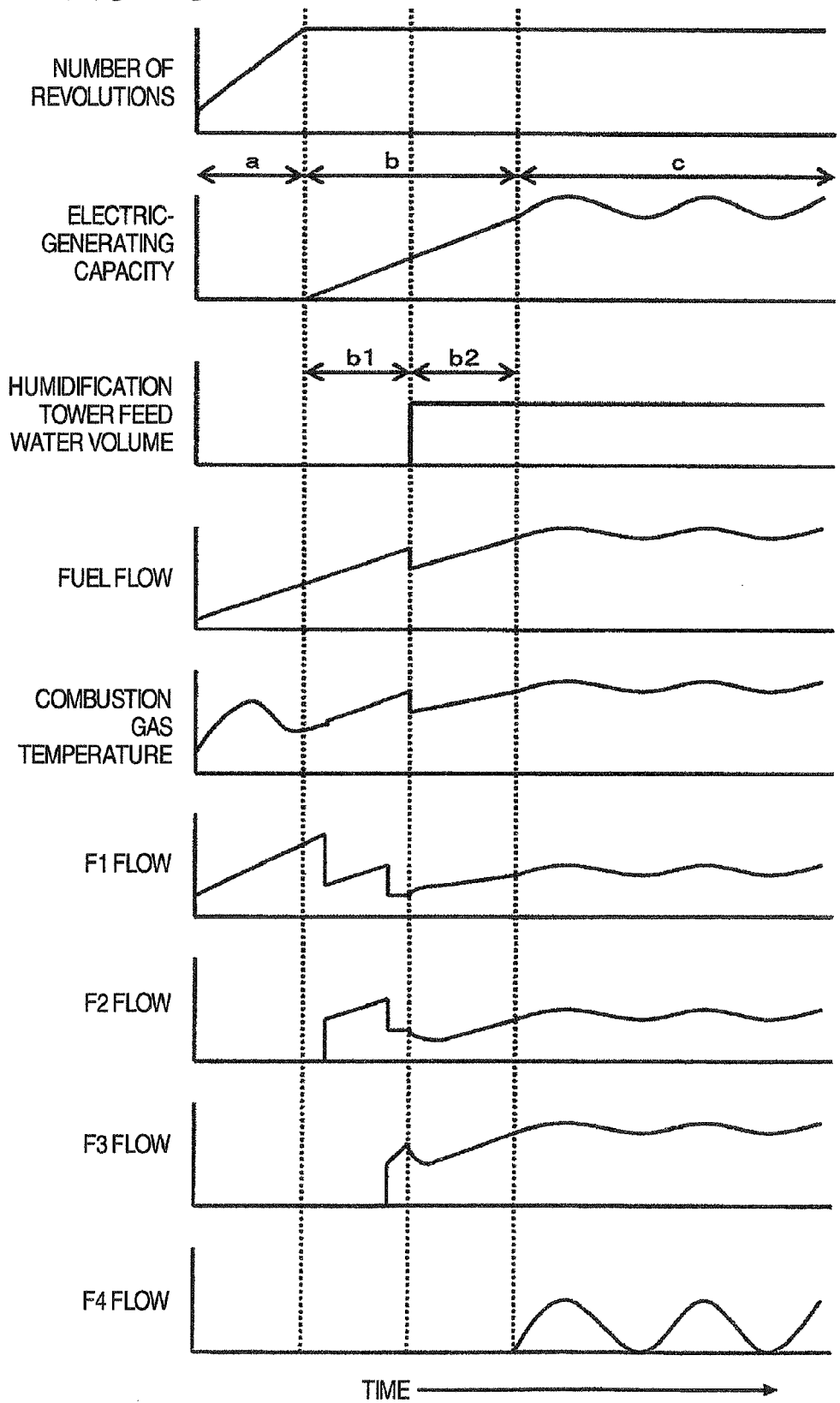
FIG. 16 is control characteristic graphs depicting an example of operating method of an advanced humid air turbine with the fuel control device of the gas turbine combustor according to the fourth embodiment of the invention.

In FIG. 16, an axis of abscissas schematically indicates time elapsing from starting and an axis of ordinates schematically indicates, in the order from above, number of revolutions, electric power generation, humidification tower feed water volume, whole fuel flow, combustion gas temperature, and individual fuel flows (F1 flow to F4 flow) of the respective fuel systems, which supply fuel to F1 burners to F4 burners.

Also, time a indicates revolution speed increasing time elapsing from starting until rated revolution speed is reached, time b indicates load increasing time during gas turbine starting, and time c indicates load-following operating time after termination of starting. Also, the load increasing time b is divided into moisture non-addition time b1 in the first half and moisture addition time b2.

In method of operating the gas turbine combustor 2 with the fuel control device of the gas turbine combustor 2 according to the embodiment, at the time of ignition and speed up when fuel flow is comparatively small, a command from a control device 400 first brings about operation with combustion only in F1 burners positioned toward an axis of the gas turbine combustor 2 (that is, feeding fuel to a fuel system 201 in FIG. 15) and speed up is accomplished to the neighborhood of rated revolution speed no-load condition. Such single combustion in F1 burners is referred to ¼ mode in the subsequent description.

Subsequently, in the subsequent load increasing process (time b), fuel is charged into F2 burners mounted on an externally circumferential side of F1 burners of the gas turbine combustor 2 and operation is performed with F1+F2. That is, fuel is supplied to the fuel systems 201, 202 and a command from the control device 400 regulates opening degrees of the flow control valves 211 to 214, respectively, mounted in the fuel systems 201, 202 to thereby control respective fuel flows. This state is referred to 2/4mode.

Subsequently, a state, in which fuel is supplied to a fuel system 203 for charging of fuel into F3 burners mounted on an externally circumferential side of F2 burners of the gas turbine combustor 2 and F3 burners are ignited, is referred to 3/4mode. In the process up to this state, moisture is not added to the humidification tower 4 of the advanced humid air turbine (b1). That is, a humidification tower feed water valve 311 for regulation of water flow supplied to the humidification tower 4 of the gas turbine combustor shown in FIG. 14A is fully closed and water volume flowing through the economizer 12 mounted downstream of the recuperator 5 is controlled by the opening degree of a humidification tower bypass valve 312.

Also, for increase in fuel flow in this course, fuel flows supplied to F1 burners, F2 burners, and F3 burners are controlled by regulating the opening degrees of the flow control valves 211, 212, 213 so as to increase electric power generation of the gas turbine according to load increase rate determined in a starting plan of the gas turbine. Also, fuel flows distributed to the fuel systems 201 to 203 for supplying to F1 burners, F2 burners, and F3 burners are supplied at ratios, which are determined so that combustion in the gas turbine combustor 2 is made stable and NOx as generated is made minimum.

In the fuel control device of the gas turbine combustor 2 of the embodiment, addition of moisture to the humidification tower 4 of the advanced humid air turbine is started in 3/4 mode. A humidification starting command opens the air cooler side humidification tower bypass valve 311 and so feed water of flow corresponding to the opening degree is injected into the humidification tower 4. Simultaneously, a humidification tower bypass valve 312 is decreased in opening degree and finally put in a fully closed state while being controlled so that water flow through the economizer 12 becomes a predetermined value.

Thereafter, by controlling the opening degree of the humidification tower feed water valve 311, regulation is accomplished so that water volume flowing through the economizer 12 becomes a predetermined value.

At this time, fuel flow supplied to the gas turbine combustor 2 is controlled so that electric power generation of the gas turbine is increased according to the load increasing rate determined in the starting plan of the gas turbine. Since fuel supplied to F1 burners plays a main role in ensuring combustion stability of the gas turbine combustor 2, it is set so that a rate of fuel flow supplied to F1 burners to whole fuel flow is increased after starting of humidification as compared with that before starting of humidification.

At a point of time, when electric power generation or turbine exhaust gas temperature reaches a predetermined amount, starting of the advanced humid air turbine is completed and thereafter fuel flow increases or decreases according to increase and decrease in load to lead to load-following (time c). High load operation is accommodated mainly by increasing or decreasing fuel flows of F4 burners mounted on an outermost circumference of the gas turbine combustor 2.

At this time, since mixtures of fuel and air supplied to F4 burners mix with combustion gases of F1 to F3 burners to become high in temperature, the fuel proceeds in oxidation reaction to enable obtaining high combustion efficiency.

Also, since air distribution is set so that temperature after completion of combustion decreases below temperature (approximately, 1600° C.), at which generation of NOx becomes remarkable, combustion is enabled, in which generation of NOx from F4 burners is made almost nil. Also, since the reaction is completed even when fuel charged into F4 burners is slight, continuous switchover of fuels is enabled to achieve improvement in operability.

Figure 17:
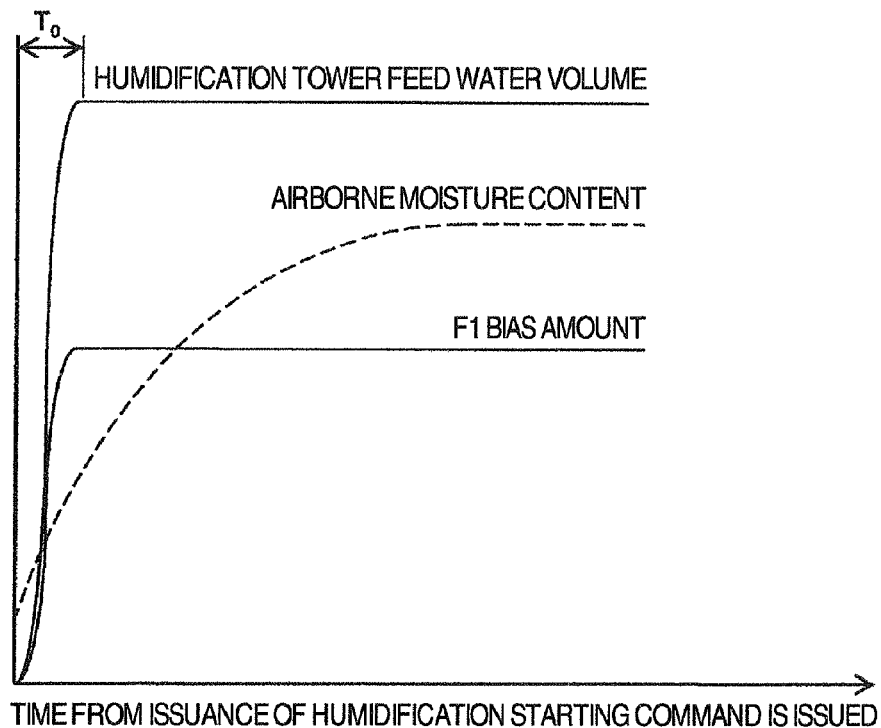
FIG. 17 is a characteristic graph depicting an example of the method of controlling an advanced humid air turbine system in the case where function of the fuel control device of the gas turbine combustor according to the fourth embodiment of the invention is stopped.

FIG. 17 is a characteristic graph depicting an example of method of controlling an advanced humid air turbine system in the case where the function of a first order lag component 420 constituting the fuel control device 400 provided on the gas turbine combustor 2 of the embodiment is stopped.

In FIG. 17, an axis of abscissas indicates time elapsing since a humidification starting command is issued. When a humidification starting command is issued from the fuel control device 400 shown in FIG. 14, the humidification tower feed water valve 311 is opened and feed water of flow corresponding to the opening degree is injected into the humidification tower 4.

Time is one denoted by $T_0$ in FIG. 17 to amount to several tens of second to one minute according to the speed of response of the valve. At this time, it is possible to determine F1 bias amount, which is bias amount of fuel flow supplied to F1 burners, on the basis of the opening degree of the humidification tower feed water valve 311 or a measured value of water volume injected into the humidification tower 4, and time of change also becomes $T_0$ in the order of several tens of second to one minute.

Incidentally, it has been found from verification tests performed by the inventors of the present application that after feed water supplied to the humidification tower 4 becomes constant in volume, moisture content in compressed air is gradually increased as shown by broken lines in FIG. 17 and becomes steady at a particular value. Time elapsing up to this state was in the order of about 10 minutes to 15 minutes and time constant τ was in the order of several minutes (3 minutes to 6 minutes) assuming that lag of increase in moisture content corresponded to a first order lag.

In the meantime, that is, for a period of time of 10 to 15 minutes, during which moisture content in compressed air becomes steady at a particular value, F1 bias amount of fuel supplied to F1 burners and found from feed water volume supplied to the humidification tower 4 becomes larger than appropriate F1 bias amount found from the moisture content, so that there is brought about a state, in which generation of NOx becomes large although combustion stability is ensured.

Figure 18:
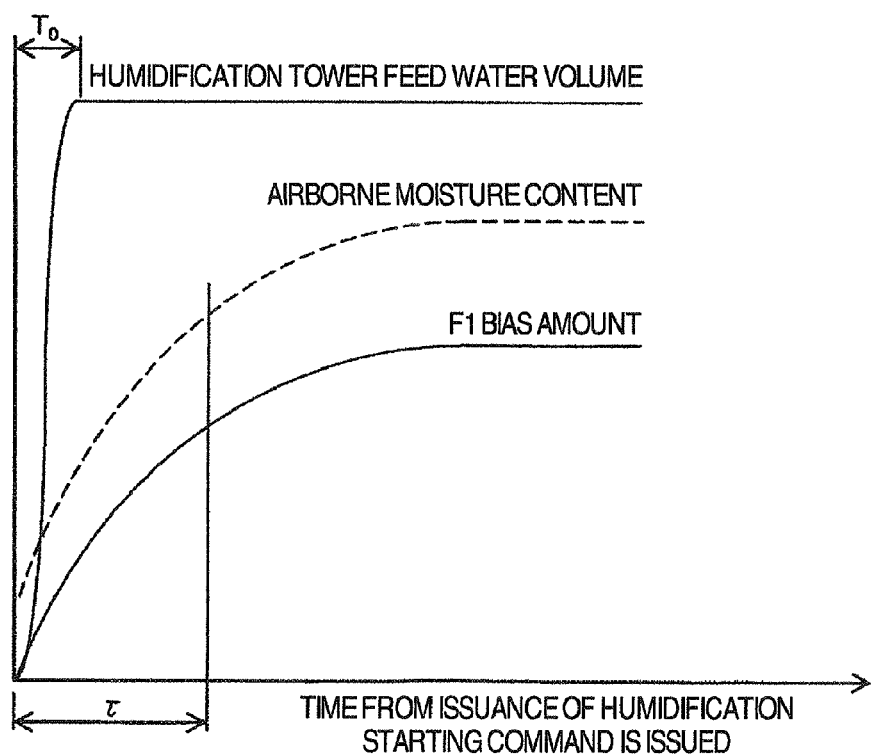
FIG. 18 is a characteristic graph depicting an example of the method of controlling an advanced high humid air turbine system in the case where the function of the fuel control device of the gas turbine combustor according to the fourth embodiment of the invention works.

Hereupon, in the fuel control method and the fuel control device of the gas turbine combustor 2 according to the embodiment, the first order lag component 420 mounted on the fuel control device 400 gives first order lag to F1 bias amount found from feed water volume supplied to the humidification tower 4 whereby change in F1 bias amount is improved to behave in the same manner as that in airborne moisture content as shown in a characteristic graph of FIG. 18 depicting an example of method of controlling an advanced humid air turbine system in the case where the function of the fuel control device of the gas turbine combustor of the embodiment works, and it is possible to bring the gas turbine combustor 2 of the embodiment close to F1 bias amount capable of low NOx and stable combustion, thereby enabling obtaining the gas turbine combustor 2, which restricts an amount of NOx as generated and ensures combustion stability.

While an explanation has been given to the behavior at the start of humidification, a further great effect is produced when the fuel control method and the fuel control device of the gas turbine combustor 2 according to the embodiment are applied at the time of stoppage of humidification.

Subsequently, referring to FIGS. 19 and 20, an explanation will be given to the fuel control method and the fuel control device of the gas turbine combustor 2 according to the embodiment, which is applied at the time of stoppage of humidification.

Figure 19:
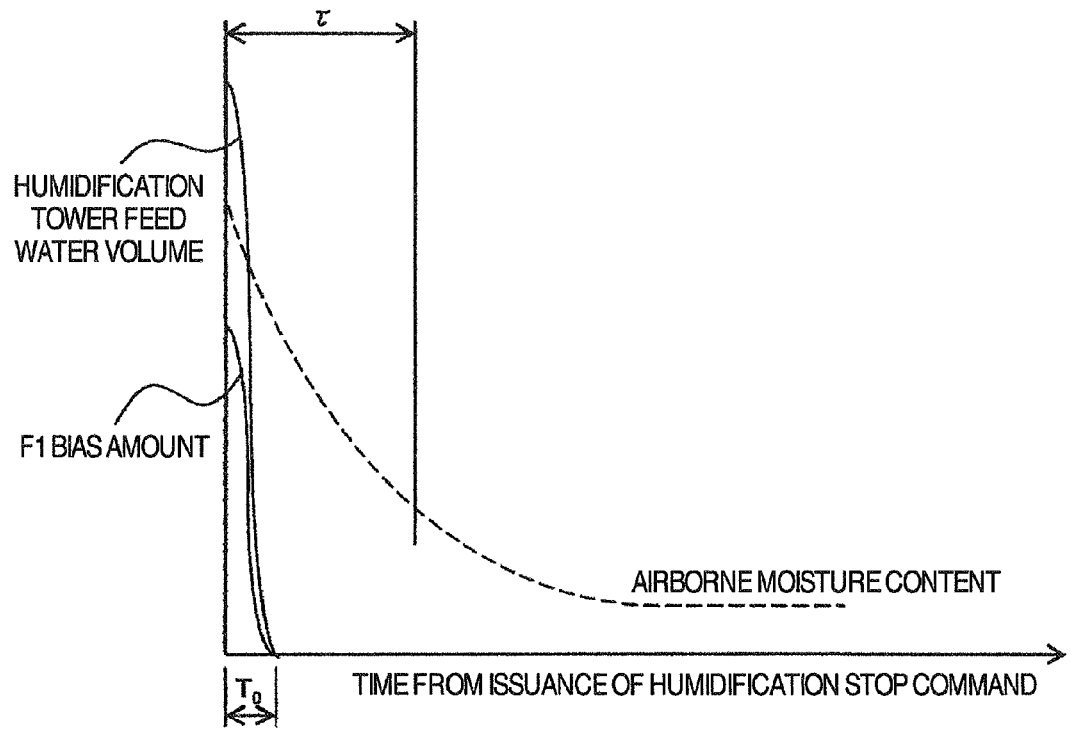
FIG. 19 is a characteristic graph depicting an example of method of controlling an advanced humid air turbine system at the time of stoppage of humidification in the case where the function of the fuel control device of the gas turbine combustor according to the fourth embodiment of the invention is stopped.

FIG. 19 is a characteristic graph depicting an example of method of controlling an advanced humid air turbine system in the case where the function of a first order lag component 420 constituting the fuel control device 400 provided on the gas turbine combustor 2 of the embodiment is stopped.

In FIG. 19, an axis of abscissas indicates time elapsing since a humidification stop command is issued. When a humidification stop command is issued from the fuel control device 400 shown in FIG. 14, the humidification tower bypass valve 312 in FIG. 14 is opened and feed water of flow corresponding to the opening degree is injected into a water recovery unit 14. Simultaneously, the humidification tower feed water valve 311 is decreased in opening degree and water volume injected into the humidification tower 4 is reduced.

Time is one denoted by $T_0$ in FIG. 19 to amount to several tens of second to one minute equivalent to $T_0$ shown in FIG. 17 at the start of humidification. At this time, it is possible to determine F1 bias amount, which is bias amount of fuel flow supplied to F1 burners, on the basis of the opening degree of the humidification tower feed water valve 311 or water volume injected into the humidification tower, and time of change also becomes $T_0$ in the order of several tens of second to one minute.

Incidentally, in the same manner as that described in FIGS. 17 and 18, also after water volume supplied to the humidification tower 4 becomes zero, moisture content in compressed air is gradually decreased as shown by broken lines in FIG. 19 and eventually becomes steady at a particular value before the start of humidification. Therefore, until moisture content in compressed air becomes steady at a particular value, F1 bias amount is made smaller than appropriate F1 bias amount found from the moisture content, so that there is brought about a state, in which combustion stability is lost.

Figure 20:
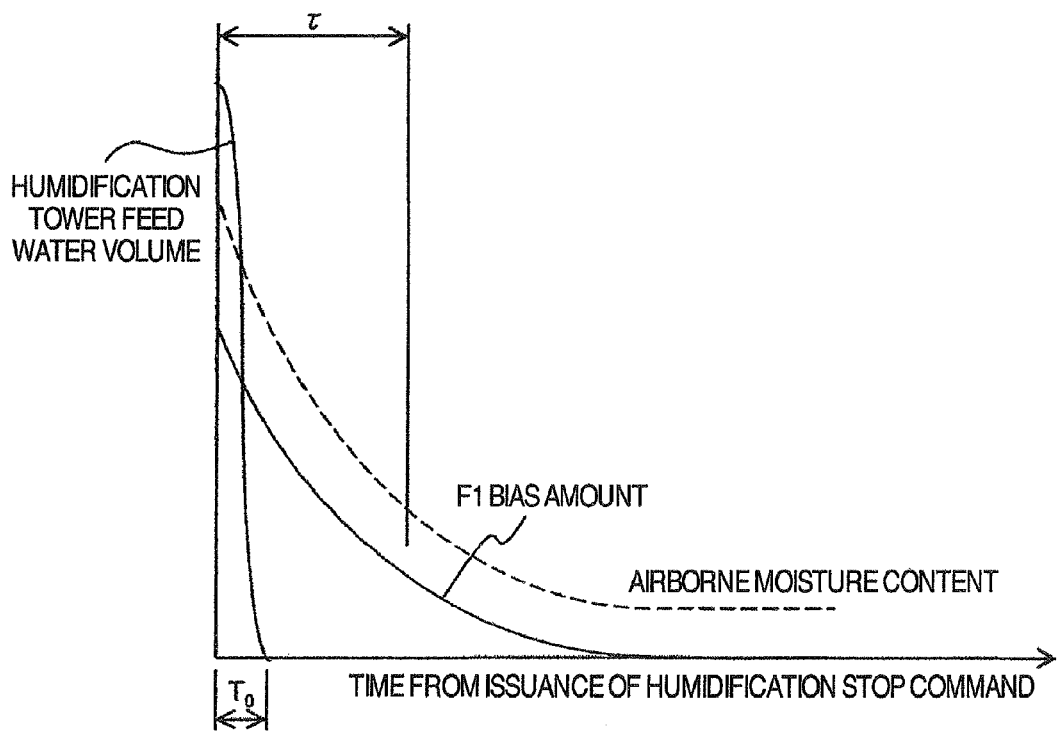
FIG. 20 is a characteristic graph depicting an example of the method of controlling an advanced high humid air turbine system at the time of stoppage of humidification in the case where the function of the fuel control device of the gas turbine combustor according to the fourth embodiment of the invention works.

Hereupon, in the fuel control method and the fuel control device of the gas turbine combustor 2 according to the embodiment, when the first order lag component 420 mounted on the control device 400 gives first order lag to F1 bias amount found from feed water volume supplied to the humidification tower 4, the amount can be brought close to an appropriate value found from the moisture content in the air as shown in a characteristic graph of FIG. 20 depicting an example of method of controlling an advanced humid air turbine system in the case where the function of the fuel control device of the gas turbine combustor of the embodiment works, so that it is possible to ensure combustion stability for the gas turbine combustor 2 of the embodiment while restricting amount of NOx as generated.

In the case where the fuel control method and the fuel control device of the gas turbine combustor according to the embodiment, thus constructed, are not used, flame stability is maintained at the start of humidification while generation of NOx becomes large, so that there is no fear of generation of gas turbine trip due to flame extinction, but gas turbine trip is possibly brought about due to flame extinction since flame stability is injured at the time of stoppage of humidification. The fuel control method and the fuel control device of the gas turbine combustor according to the embodiment can solve such state, so that application of them, in particular, at the time of stoppage of humidification produces a great effect.

Figure 21:
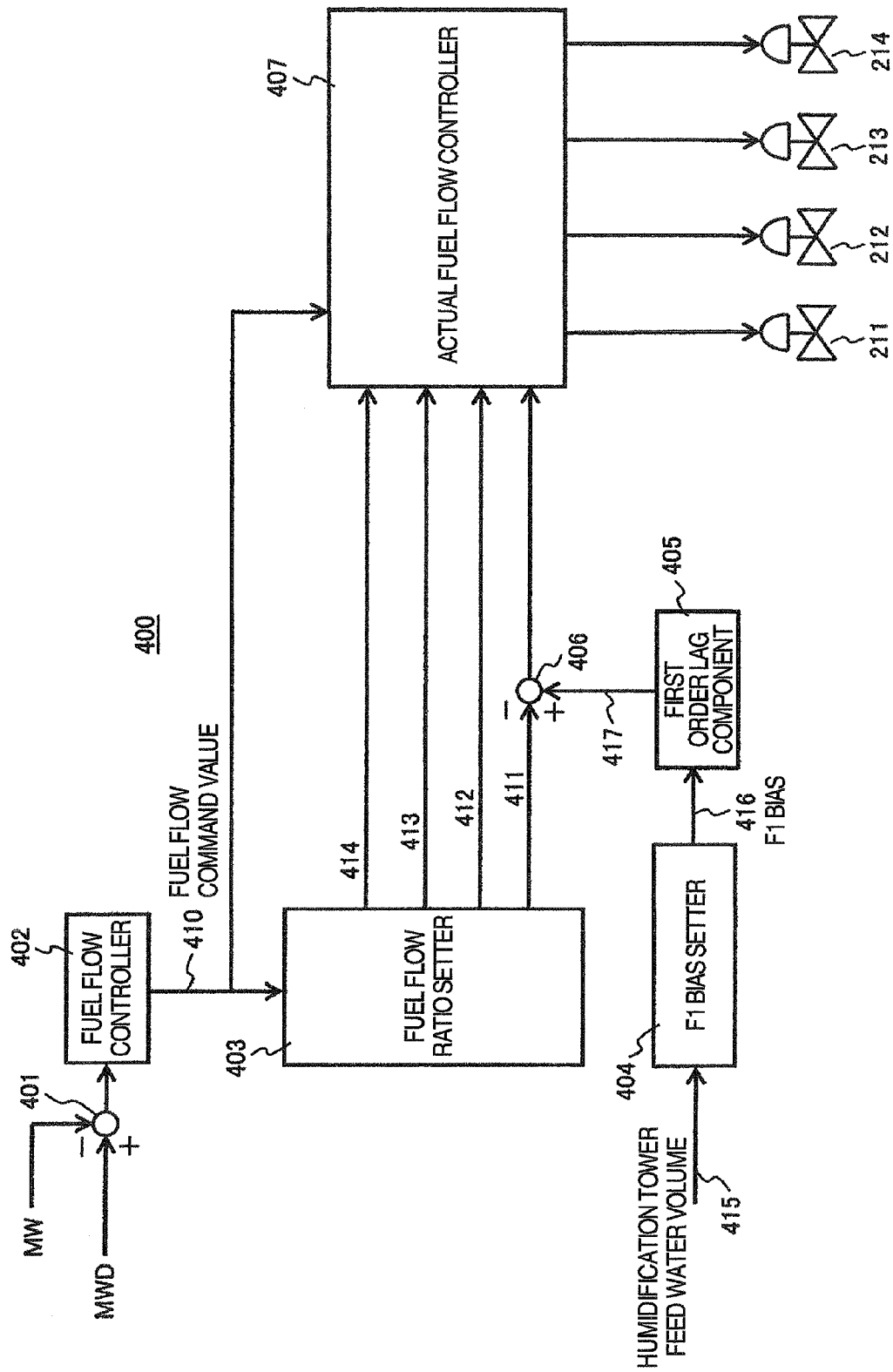
FIG. 21 is a control block diagram showing construction of the fuel control device of the gas turbine combustor according to the fourth embodiment of the invention.

FIG. 21 shows an example of control block of the fuel control device 400 of the gas turbine combustor 2 according to the embodiment.

The fuel control device 400 of the gas turbine combustor 2 according to the embodiment comprises a subtractor 401, a fuel flow controller 402, a fuel flow ratio setter 403, a F1 bias setter 404, a first order lag component 405, an adder 406, and an actual fuel controller 407.

In the fuel control device 400, the subtractor 401 finds difference between load command MWD, which is given in a manner to follow predetermined electric power generation increasing rate, and actual electric power generation MW, and on the basis of that difference between the load command MWD and the actual electric power generation MW, which is found by the subtractor 401, the fuel flow controller 402 calculates fuel flow command value 410 supplied to the gas turbine combustor 2.

On the basis of the fuel flow command value 410 calculated by the fuel flow controller 402, the fuel flow ratio setter 403 calculates respective fuel flow ratios (411 to 414) of fuel supplied to F1 burners~F4 burners mounted on the gas turbine combustor 2.

Subsequently, the F1 bias setter 404 calculates F1 bias 416, which imparts bias to fuel supplied to F1 burners mounted on the gas turbine combustor 2, on the basis of a measured value 415 of feed water volume supplied to the humidification tower 4 of the advanced humid air turbine system.

The first order lag component 405 calculates F1 bias (lag) 417 on the basis of the F1 bias 416 calculated by the F1 bias setter 404, the adder 406 calculates a sum of the F1 bias (lag) 417 and the fuel flow ratio (411) calculated by the fuel flow ratio setter 403, and the sum of the F1 bias (lag) 417 and the fuel flow ratio (411), which sum is calculated by the adder 406, are input into the actual fuel controller 407.

The actual fuel controller 407 inputs thereinto respective fuel flow ratios (411 to 414) of F1 burners to F4 burners and the fuel flow command value 410 calculated by the fuel flow controller 402 to calculate and output, respectively, flows of the respective systems for F1 to F4 or valve opening degrees (211 to 214) to control valve opening degrees of the fuel flow control valves 211 to 214 for regulation of fuel flows fed to F1 burners to F4 burners mounted on the gas turbine combustor 2.

Thus the fuel control device 400 provided with the control block shown in FIG. 21 can calculate F1 bias amount shown in the characteristic graphs in FIGS. 18 and 20.

In the fuel control device 400 of the gas turbine combustor 2 according to the embodiment, an example of measured value of humidification tower feed water volume 415 supplied to the humidification tower 4 is indicated as input 415 of the F1 bias setter 404, but an opening degree signal of the feed water volume control valve 311 for feeding to the humidification tower 4 can replace the former. In this case, while variation in pressure condition across the feed water volume control valve 311 causes a poor accuracy as compared with actual flow measurement values, any flowmeter for measurement of humidification tower feed water volume 418 is dispensed with, and so a control system is made simple. Alternatively, it is conceivable to make a humidification starting command be an input value for the sake of further simple operation.

According to the embodiment, it is possible to realize fuel control method and a fuel control device of a gas turbine combustor for advanced humid air turbines, in which method and device the gas turbine combustor can perform combustion stably with low NOx in the case where transient change in condition against generation of NOx and flame stability in the gas turbine combustor occurs after addition of moisture to a humidification tower of an advanced humid air turbine is started.

Subsequently, referring to FIG. 22, an explanation will be given to fuel control method and a fuel control device of a gas turbine combustor, according to a fifth embodiment of the invention, mounted in an advanced humid air turbine.

Since the fuel control method and the fuel control device of the gas turbine combustor according to the embodiment are common in fundamental construction to the fuel control method and the fuel control device of the gas turbine combustor according to the fourth embodiment, an explanation common to the both is omitted and only different portions will be described hereinafter.

Figure 22:
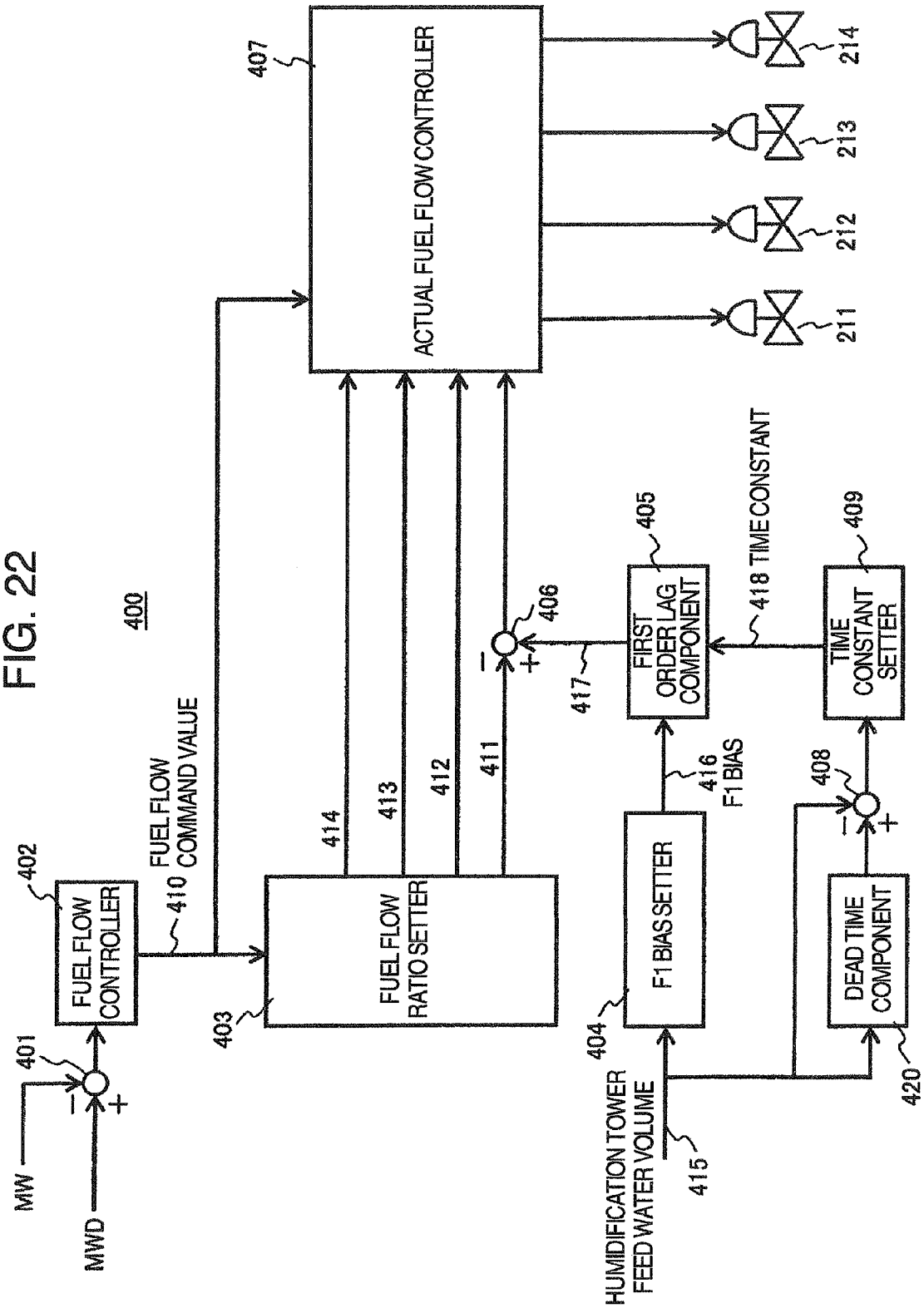
FIG. 22 is a control block diagram showing construction of a fuel control device of a gas turbine combustor according to a fifth embodiment of the invention.

FIG. 22 shows the fuel control device of the gas turbine combustor, according to the fifth embodiment of the invention, mounted in an advanced humid air turbine, and the fuel control device is different from the fuel control device of the gas turbine combustor, according to the fourth embodiment, shown in FIG. 21 in that a dead time component 420, a subtractor 408, and a time constant setter 409 are further provided in order to calculate a time constant 418 input into the first order lag component 405, which constitute the fuel control device 400.

In the fuel control device 400 of the gas turbine combustor 3, according to the fourth embodiment, shown in FIG. 21, the time constant 418 input into the first order lag component 405 mounted on the fuel control device 400 is a constant value. This value may be beforehand selected on the basis of, for example, data obtained in a trial operation, and may be used as being constant at all times.

However, an optimum time constant differs in the case before and after starting of humidification, in which feed water flow to the humidification tower 4 varies comparatively greatly, and in the case where the feed water flow to the humidification tower 4 varies comparatively less, like variation in water volume in the load operation after starting of humidification.

Hereupon, in the fuel control device 400 of the gas turbine combustor 3 according to the embodiment, time variation of feed water flow measurement 418 obtained in measurement of feed water supplied to the humidification tower 4 is calculated by the subtractor 408, such that time variation of the feed water flow measurement 418 is calculated by using the subtractor 408 to subtract the feed water flow measurement 418 through the first order lag component 405 from a feed water flow measurement 418 as measured, and the time constant setter 409 calculates an optimum time constant 418 on the basis of a value of the time variation of the feed water flow measurement 418 calculated by using the subtractor 408, which optimum time constant is made an input to the first order lag component 405.

Using the time constant 418, the first order lag component 405 calculates F1 bias 417 obtained by adding a first order lag component to F1 bias 416, which is calculated by the F1 bias setter 404 to impart bias to fuel supplied to F1 burners of the gas turbine combustor 2, to output the same to the adder 406.

In the fuel control device 400 of the gas turbine combustor 3, according to the embodiment, constructed in a manner described above, there is not only provided a gas turbine combustor, which is stable with low NOx when change in feed water flow to the humidification tower 4 is large before and after humidification, as described with respect to the fuel control device 400 of the gas turbine combustor 3 according to the fourth embodiment, but also when change in feed water flow to the humidification tower 4 is relatively small like the water flow variation at the load operation after humidification is started, it is possible to cause change in F1 bias of the gas turbine combustor 3 to follow change in moisture content, thus enabling holding a combustion state of the gas turbine combustor 3 stably at all times.

According to the embodiment, it is possible to realize fuel control method and a fuel control device of a gas turbine combustor for advanced humid air turbines, in which method and device the gas turbine combustor can perform combustion stably with low NOx in the case where transient change in condition against generation of NOx and flame stability in the gas turbine combustor occurs after addition of moisture to a humidification tower of an advanced humid air turbine is started.

The invention is applicable to fuel control method and a fuel control device of a gas turbine combustor for advanced humid air turbines.

It should be further understood by those skilled in the art that although the foregoing description has been made on embodiments of the invention, the invention is not limited thereto and various changes and modifications may be made without departing from the spirit of the invention and the scope of the appended claims.

The invention claimed is:

1. A fuel control system for humid air turbines, comprising:
   a control device;
   a compressor which compresses intake air into high pressure air;
   a gas turbine combustor, which generates a combustion gas;
   a turbine driven by the combustion gas;
   a humidification tower that is configured to humidify the high pressure air into humid air; and
   a recuperator, in which the humid air is heated by an exhaust gas discharged from the turbine thereby forming high temperature air, wherein
   the gas turbine combustor includes plural combustion units comprising plural fuel nozzles that are configured to supply fuel and plural air nozzles that are configured to supply a portion of the high temperature air, in order to burn the fuel and the portion of the high temperature air to generate the combustion gas, a first group of the plural combustion units having a higher flame stabilizing performance than a second group of the plural combustion units,
   wherein the control device is configured to:
      compute an air humidity of the humid air, wherein the air humidity is computed as a ratio of a saturated vapor pressure to a measured internal pressure of the humidification tower, wherein the saturated vapor pressure is calculated from an internal air temperature in the humidification tower;
      compute a combustion air temperature based on the computed air humidity, the measured internal pressure of the humidification tower, and the internal air temperature of the humidification tower;
      compute a combustion temperature from the computed combustion air temperature;
      compute a calculated F1 bias by comparing the computed combustion temperature to a known combustion temperature required to ensure stable combustion, wherein the calculated F1 bias is a bias of fuel flow fed to the first group of the plural combustion units;

set a first fuel flow ratio, at which fuel is fed to the first group of the plural combustion units as a function of the calculated F1 bias; and set a second fuel flow ratio at which fuel is fed to the second group of the plural combustion units.

2. The fuel control system according to claim 1, wherein the plural air nozzles are formed on an air nozzle plate and are made respectively coaxial with the plural fuel nozzles to feed the portion of the high temperature air, and wherein the first group of the plural combustion units are positioned radially inward of the second group of the plural combustion units.

3. The fuel control system according to claim 1, wherein the control device is further configured to:

estimate the internal air temperature in the humidification tower from a water temperature of feed water fed to the humidification tower, a water temperature of a circulating system, which resupplies surplus water of the humidification tower to the humidification tower, and a temperature of air flowing into the humidification tower.

4. The fuel control system according to claim 2, wherein the control device is further configured to:

estimate the internal air temperature in the humidification tower from a water temperature of feed water fed to the humidification tower, a water temperature of a circulating system, which resupplies surplus water of the humidification tower to the humidification tower, and a temperature of air flowing into the humidification tower.

* * * * *